US011110957B2

(12) United States Patent
Stewart et al.

(10) Patent No.: US 11,110,957 B2
(45) Date of Patent: *Sep. 7, 2021

(54) MATERIALS HANDLING VEHICLE OBSTACLE SCANNING TOOLS

(71) Applicant: Crown Equipment Corporation, New Bremen, OH (US)

(72) Inventors: Alan Stewart, Auckland (NZ); Yuan Mai, Auckland (NZ)

(73) Assignee: Crown Equipment Corporation, New Bremen, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/791,692

(22) Filed: Feb. 14, 2020

(65) Prior Publication Data

US 2020/0180690 A1 Jun. 11, 2020

Related U.S. Application Data

(63) Continuation of application No. 16/569,072, filed on Sep. 12, 2019, now Pat. No. 10,597,074, which is a (Continued)

(51) Int. Cl.
*B62D 6/10* (2006.01)
*B66F 9/24* (2006.01)
(Continued)

(52) U.S. Cl.
CPC ............... *B62D 6/10* (2013.01); *B60P 1/00* (2013.01); *B60W 30/09* (2013.01); *B66F 9/063* (2013.01);
(Continued)

(58) Field of Classification Search
CPC . B62D 6/10; B66F 9/24; B66F 9/0755; B66F 9/063; B66F 9/07568;
(Continued)

(56) References Cited

U.S. PATENT DOCUMENTS 4,005,838 A 2/1977 Grundy
4,660,895 A 4/1987 Chlumecky et al.
(Continued)

FOREIGN PATENT DOCUMENTS

CN 2328020 Y 7/1999
CN 105261236 A 1/2016
(Continued)

OTHER PUBLICATIONS

Invitation to Pay Additional Fees pertaining to PCT/US2017/048612 dated Nov. 7, 2017.
(Continued)

*Primary Examiner* — Russell Frejd
(74) *Attorney, Agent, or Firm* — Dinsmore & Shohl LLP

(57) ABSTRACT

A materials handling vehicle comprises an obstacle scanning tool and steering mechanism, materials handling hardware, vehicle drive mechanism, and user interface that facilitate movement of the materials handling vehicle and materials handled along a travel path. The tool establishes a scan field, a filter field, and a performance field, and is configured to indicate the presence of obstacles in the filter field and the performance field. The tool executes logic to establish the performance field in response to an input performance level, scan for obstacles in the filter field and the performance field, execute obstacle avoidance for obstacles detected in the filter field, and execute a performance level reduction inquiry for obstacles detected in the performance field wherein outcomes of the inquiry comprise reduction of the performance level when a performance level reduction is available and execution of obstacle avoidance when a performance level reduction is not available.

24 Claims, 8 Drawing Sheets

Related U.S. Application Data continuation of application No. 15/686,606, filed on Aug. 25, 2017, now Pat. No. 10,450,001.

(60) Provisional application No. 62/380,038, filed on Aug. 26, 2016.

(51) Int. Cl.

| | | |
|---|---|---|
| *G05D 1/02* | (2020.01) | |
| *B66F 9/075* | (2006.01) | |
| *B60P 1/00* | (2006.01) | |
| *B60W 30/09* | (2012.01) | |
| *B66F 9/06* | (2006.01) | |

(52) U.S. Cl.
CPC ........ *B66F 9/0755* (2013.01); *B66F 9/07568* (2013.01); *B66F 9/24* (2013.01); *G05D 1/024* (2013.01); *G05D 1/0223* (2013.01); *G05D 2201/0216* (2013.01)

(58) Field of Classification Search
CPC ................ G05D 1/0223; G05D 1/024; G05D 2201/0216; B60P 1/00; B60W 30/09; B60W 40/105
See application file for complete search history.

(56) References Cited

U.S. PATENT DOCUMENTS

| | | | |
|---|---|---|---|
| 4,755,089 A | 7/1988 | Ellgass | |
| 4,811,228 A | 3/1989 | Hyyppae | |
| 4,846,297 A | 7/1989 | Field et al. | |
| 5,111,401 A | 5/1992 | Everett, Jr. et al. | |
| 5,295,551 A | 3/1994 | Sukonick | |
| 5,524,548 A | 6/1996 | Fox | |
| 5,612,883 A | 3/1997 | Shaffer et al. | |
| 5,764,014 A | 6/1998 | Jakeway et al. | |
| 5,970,433 A | 10/1999 | Oka et al. | |
| 6,393,362 B1 | 5/2002 | Burns | |
| 6,667,592 B2 | 12/2003 | Jacobs et al. | |
| 6,784,800 B2 | 8/2004 | Orzechowski | |
| 6,799,100 B2 | 9/2004 | Burns et al. | |
| 7,073,753 B2 | 7/2006 | Root et al. | |
| 7,206,686 B2 | 4/2007 | Sawamoto et al. | |
| 7,266,453 B2 | 9/2007 | Sawamoto et al. | |
| 7,742,841 B2 | 6/2010 | Sakai et al. | |
| 7,742,853 B2 | 6/2010 | Mori et al. | |
| 7,809,506 B2 | 10/2010 | Kuge et al. | |
| 7,826,970 B2 | 11/2010 | Kobayashi et al. | |
| 7,925,409 B2 | 4/2011 | Fry et al. | |
| 8,050,863 B2 | 11/2011 | Trepagnier et al. | |
| 8,180,514 B2 | 5/2012 | Kaprielian et al. | |
| 8,210,791 B2 | 7/2012 | Chilson et al. | |
| 8,228,510 B2 | 7/2012 | Pangrazio et al. | |
| 8,346,480 B2 | 1/2013 | Trepagnier et al. | |
| 8,427,472 B2 | 4/2013 | Moravec | |
| 8,485,301 B2 | 7/2013 | Grubaugh et al. | |
| 8,538,610 B2 | 9/2013 | Liberatore | |
| 8,688,275 B1 | 4/2014 | LaFary et al. | |
| 8,725,294 B2 | 5/2014 | Gienger | |
| 8,755,035 B2 | 6/2014 | Mizuno et al. | |
| 8,965,677 B2 | 2/2015 | Breed et al. | |
| 9,168,656 B1 | 10/2015 | Wang et al. | |
| 9,310,608 B2 | 4/2016 | Weiss et al. | |
| 9,336,684 B2 | 5/2016 | Harasaki | |
| 9,410,811 B2 | 8/2016 | Pfaff et al. | |
| 2005/0021195 A1 | 1/2005 | Zeitler et al. | |
| 2005/0131645 A1 | 6/2005 | Panopoulos | |
| 2010/0235033 A1 | 9/2010 | Yamamoto et al. | |
| 2010/0241289 A1 | 9/2010 | Sandberg | |
| 2011/0037963 A1 | 2/2011 | Weiss et al. | |
| 2014/0114526 A1 | 4/2014 | Erb | |
| 2014/0210646 A1 | 7/2014 | Subramanya | |
| 2014/0278029 A1 | 9/2014 | Tonguz et al. | |
| 2015/0170498 A1 | 6/2015 | Beggs et al. | |
| 2015/0221222 A1 | 8/2015 | Hamada et al. | |
| 2015/0326829 A1 | 11/2015 | Kurihara et al. | |
| 2016/0098648 A1 | 4/2016 | Katsuki et al. | |
| 2016/0189443 A1 | 6/2016 | Smith | |
| 2016/0236347 A1 | 8/2016 | Shikina et al. | |
| 2017/0017236 A1 | 1/2017 | Song et al. | |
| 2017/0049288 A1 | 2/2017 | Knutson et al. | |
| 2017/0082751 A1 | 3/2017 | Maisonnier et al. | |
| 2018/0059682 A1 | 3/2018 | Thode | |

FOREIGN PATENT DOCUMENTS

| | | |
|---|---|---|
| DE | 102010025612 A1 | 3/2011 |
| DE | 102012008846 A1 | 11/2012 |
| DE | 102013009082 A1 | 12/2013 |
| EP | 2754584 A2 | 12/2013 |
| EP | 2851331 A1 | 9/2014 |
| EP | 2848502 A2 | 3/2015 |
| EP | 2848502 A3 | 8/2015 |
| EP | 2952928 A1 | 12/2015 |
| EP | 3059650 A1 | 8/2016 |
| EP | 2848502 B1 | 11/2017 |
| GB | 2413449 A | 10/2005 |
| JP | S6465477 A | 3/1989 |
| JP | 2006259877 A | 9/2006 |
| WO | 2013074035 A1 | 5/2013 |
| WO | 2016102130 A1 | 6/2016 |
| WO | 2017050358 A1 | 3/2017 |

OTHER PUBLICATIONS

Benmounah et al., "Obstacle Detection and Decision Making for Intelligent Mobile Robot", p. 537-53S no date.

Bouguerra et al., "An Autonmous Robotic System for Load Transportation", Orebro University and Halmstad Wniversity, p. 1-4, no date.

Engerke et al., "Trajectories and Simulation Model of AGVs with Trailers", ABCM Symposium Series in Mchatronics, 2010, vol. 4, p. 509-518.

Mehrdadi et al., "Design of a Navigation System for Automated Guided Vehicles Operating in a Man-Machine Shared Environment", Transactions on Engineering Sciences, 1997, vol. 16, WIT Press, 10 pgs.

Shaikh et al., "AGV Path Planning and Obstacle Avoidance Using Dijkstra's Algorithm", International Journal of Application or Innovation in Engineering & Management (IJAIEM), 2013, 2: 6, p. 77-83.

Yahja et al., "Framed-Quadtree Path Planning for Mobile Robots Operating in Sparse Environments", IEEE Conference on Robotics and Automation (ICRA), Levuen, Belgium, May 199a. 6 pgs.

Egemin Automation, AGV Safety Spec Sheet, 2015,. 2 pgs.

Huang et al., "An Intent Inference Based Dynamic Obstacle Avoidance Method of Intelligent Vehicle in Structured Environment", Dec. 6-9, 2015, Robotics and Biomimetics (ROBIO), 2015 IEEE International Conference, DOI: 10.1109/ROBIO.2015.7418977, 3 pgs.

University of Alicante (Universitat d'Alacant), "Autonomous Vehicles for Transport of Materials in Warehouse", p. 1-5, no date.

ASTI helps to optimise material handling operations for Aciturri, Mining, Pack Stack Rack and Roll, Power and Fuel, RFID and IT, Safety at Work, Oct. 11, 2011, MHWmagazine, 7 pgs.

Cisco-Eagle, "Preventing a Forklist Collision", 2017,_ 3 pgs.

AutoGuide Mobile Robots, "Man-Aboard lugger AGVs", Catalog/Spec Sheet, 2017, 9 pgs.

Paifuku, "SmartCart—Automatic Guided Cart Installed Systems", Catalog/Spec Sheet, 2015,_ 44 pgs.

Written Opinion relating to Interaitonal application No. PCT/US2017/048612 dated Feb. 27, 2018.

International Search Report relating to International Application No. PCT/US2017/048612 dated Feb. 27, 2018.

MATERIALS HANDLING VEHICLE OBSTACLE SCANNING TOOLS

CROSS-REFERENCE TO RELATED APPLICATIONS

This application is a continuation of U.S. patent application Ser. No. 16/569,072, filed Sep. 12, 2019, now U.S. Pat. No. 10,597,074, which is a continuation of U.S. patent application Ser. No. 15/686,606, filed Aug. 25, 2017, now U.S. Pat. No. 10,450,001, which claims the benefit of U.S. Provisional Application Ser. No. 62/380,038, filed Aug. 26, 2016, the contents of which are incorporated by reference herein in their entirety.

BACKGROUND

The present disclosure relates to obstacle detection and avoidance and, more particularly, to materials handling vehicles equipped to detect and avoid obstacles in a warehouse. For the purposes of defining and describing the concepts and scope of the present disclosure, it is noted that a "warehouse" encompasses any indoor or otherwise covered facility in which materials handling vehicles transport goods including, but not limited to, warehouses intended primarily for the storage of goods, such as those where multi-level warehouse racks are arranged in aisles, and manufacturing facilities where goods are transported about the facility by materials handling vehicles for use in one or more manufacturing processes.

BRIEF SUMMARY

According to the subject matter of the present disclosure, a materials handling vehicle comprises a steering mechanism, materials handling hardware, a vehicle drive mechanism, a user interface, and an obstacle scanning tool. The steering mechanism, materials handling hardware, vehicle drive mechanism, and user interface facilitate movement of the materials handling vehicle and materials handled by the materials handling vehicle along a travel path in a warehouse at a vehicle speed $S_C$ towards a destination. The obstacle scanning tool comprises obstacle scanning hardware establishing a scan field, a path filter establishing a filter field, and a performance filter establishing a performance field $P_i$, and is configured to indicate the presence of obstacles in the filter field and the performance field $P_i$. The obstacle scanning tool executes obstacle scanning logic to establish the filter field using the path filter, establish the performance field $P_i$ in response to an input performance level $L_i$ using the performance filter, scan for obstacles in the filter field and the performance field $P_i$, execute obstacle avoidance for obstacles detected in the filter field, and execute a performance level reduction inquiry for obstacles detected in the performance field $P_i$ wherein outcomes of the performance level reduction inquiry comprise reduction of the performance level $L_i$ when a performance level reduction is available and execution of obstacle avoidance when a performance level reduction is not available.

In embodiments, the performance level reduction inquiry comprises a current vehicle speed query to confirm that a current speed $S_c$ of the materials handling vehicle along the travel path is not greater than a maximum speed $S_i$Max associated with the performance level $L_i$, and the obstacle scanning tool conditions reduction of the performance level $L_i$ on a determination that the current speed $S_c$ is not greater than a maximum speed $S_i$Max. The performance level reduction inquiry may comprise a current performance level query to confirm that the performance level $L_i$ is greater than a minimum performance level associated with the materials handling vehicle, and the obstacle scanning tool conditions reduction of the performance level $L_i$ on a determination that the performance level $L_i$ is greater than the minimum performance level. The performance level reduction inquiry may comprise a current vehicle speed query to confirm that a current speed $S_c$ of the materials handling vehicle along the travel path is not greater than a maximum speed $S_i$Max associated with the performance level $L_i$, the performance level reduction inquiry comprises a current performance level query to confirm that the performance level $L_i$ is greater than a minimum performance level associated with the materials handling vehicle, and the obstacle scanning tool conditions reduction of the performance level $L_i$ on determinations that the current speed $S_c$ is not greater than a maximum speed $S_i$Max and the performance level $L_i$ is greater than the minimum performance level.

In embodiments, the obstacle avoidance is executed using the steering mechanism, the vehicle drive mechanism, or both. The performance level may be input at the user interface or in response to an external stimulus. The filter field may be disposed within the performance field $P_i$. The obstacle scanning tool may comprise a plurality of performance filters establishing a respective plurality of performance fields. A performance field $P_{(i-1)}$ may comprise a maximum speed $S_{(i-1)}$ Max associated with the performance level $L_{(i-1)}$ and may be disposed within the performance field $P_i$. The performance level reduction inquiry further may comprise a current vehicle speed query to confirm that a current speed $S_c$ of the materials handling vehicle along the travel path is not greater than the maximum speed $S_{(i-1)}$ Max associated with the performance level $L_{(i-1)}$, the performance level reduction inquiry comprises a current performance level query to confirm that the performance level $L_i$ is greater than a minimum performance level associated with the materials handling vehicle, the obstacle scanning tool conditions reduction of the performance level $L_i$ to the performance level $L_{(i-1)}$ on determinations that the current speed $S_c$ is not greater than a maximum speed $S_{(i-1)}$ Max and the performance level $L_i$ is greater than the minimum performance level, and reduction of the performance level $L_i$ to the performance level $L_{(i-1)}$ comprises corresponding reduction in the performance field $P_i$ to the performance field $P_{(i-1)}$.

In further embodiments, the filter field is an area along the travel path and within the scan field in which the obstacle scanning tool processes scan data from the obstacle scanning hardware to identify obstacles along the travel path and in the filter field. The obstacle scanning tools may comprise an anticipated path filter configured to bound to the travel path outside of the scan field at a distance from the travel path. The distance may be a fixed distance from the travel path. Alternatively, the distance may be configured to vary based on at least one of an anticipated travel direction along the travel path, an anticipated travel speed, and an anticipated steer angle at a destination along the travel path. The filter field may be configured to adapt a field shape based on a determination that the materials handling vehicle is approaching an intersection and a current speed $S_c$ of the materials handling vehicle. The obstacle scanning tool may comprise one or more overlay filters establishing one or more overlay fields configured to overlay one or more zones of an intersection, and the filter field is configured to adapt a field shape to include the one or more overlay filters based on a determination that the materials handling vehicle is approaching the intersection. The obstacle scanning tool may execute obstacle scanning logic to execute a performance level increase inquiry comprising an outcome of an increase of the performance level $L_i$ when obstacles are not detected in the performance field $P_i$.

In accordance with one embodiment of the present disclosure, a materials handling vehicle comprises a steering mechanism, materials handling hardware, a vehicle drive mechanism, a user interface, and an obstacle scanning tool, wherein the steering mechanism, materials handling hardware, vehicle drive mechanism, and user interface facilitate movement of the materials handling vehicle and materials handled by the materials handling vehicle along a travel path in a warehouse at a vehicle speed $S_C$ towards a destination. The obstacle scanning tool comprises obstacle scanning hardware establishing a scan field, and a path filter establishing a filter field $F_i$, and is configured to indicate the presence of obstacles in the filter field $F_i$. The obstacle scanning tool executes obstacle scanning logic to establish the filter field $F_i$ in response to an input performance level $L_i$ using the path filter, scan for obstacles in the filter field $F_i$, execute a performance level reduction inquiry for obstacles detected in the filter field $F_i$ wherein outcomes of the performance level reduction inquiry comprise reduction of the performance level $L_i$ when a performance level reduction is available and execution of obstacle avoidance when a performance level reduction is not available.

In accordance with another embodiment of the present disclosure, a materials handling vehicle comprises a towing vehicle and at least one trailer towed by the towing vehicle. The towing vehicle comprises a steering mechanism, materials handling hardware, a vehicle drive mechanism, a user interface, and an obstacle scanning tool. The steering mechanism, materials handling hardware, vehicle drive mechanism, and user interface facilitate movement of the materials handling vehicle and materials handled by the materials handling vehicle along a curved travel path in a warehouse towards a destination. A towing configuration of the materials handling vehicle establishes a trailer turning radius $r_1$ that is smaller than a towing vehicle turning radius $r_2$ along curved portions of the curved travel path. The obstacle scanning tool comprises obstacle scanning hardware establishing a scan field and a path filter establishing a filter field, and is configured to indicate the presence of obstacles in the filter field. The obstacle scanning tool executes obstacle scanning logic to use the path filter to establish the filter field such that the area of the filter field is skewed towards the inside edges of turns along the curved travel path to a degree that is sufficient to account for the smaller turning radius $r_1$ of the trailer and avoid collisions with obstacles along the inside edges of the turns along the curved travel path.

In embodiments, an obstacle for the trailer along the inside edges of the turns along the curved travel path comprises the towing vehicle, and the filter field is skewed toward the inside edges of turns along the curved travel path to avoid collisions between the towing vehicle and the at least one trailer. The at least one trailer may comprise a plurality of trailers, and an obstacle for each trailer along the inside edges of the turns along the curved travel path comprises one of the towing vehicle and another trailer of the plurality of trailers, and the filter field is skewed toward the inside edges of turns along the curved travel path to avoid collisions between the towing vehicle and one of the plurality of trailers and between one of the plurality of trailers with another one of the plurality of trailers.

In accordance with yet another embodiment of the present disclosure is a method of executing scanning logic for a materials handling vehicle, the method comprising moving the materials handling vehicle and materials handled by the materials handling vehicle along a travel path in a warehouse at a vehicle speed $S_C$ towards a destination, the materials handling vehicle comprising a steering mechanism, materials handling hardware, a vehicle drive mechanism, a user interface, and an obstacle scanning tool. The steering mechanism, materials handling hardware, vehicle drive mechanism, and user interface facilitate movement of the materials handling vehicle and materials handled along the travel path. The obstacle scanning tool comprises obstacle scanning hardware, a path filter, and a performance filter. The method further comprises establishing a scan field through use of the obstacle scanning hardware of the obstacle scanning tool, establishing a filter field through use of the path filter of the obstacle scanning tool, establishing a performance field $P_i$ through use of the performance filter of the obstacle scanning tool, scanning with the obstacle scanning tool for obstacles in the filter field and the performance field $P_i$, executing obstacle avoidance through the obstacle scanning tool for obstacles detected in the filter field, executing a performance level reduction inquiry for obstacles detected in the performance field $P_i$, executing an outcome of the performance level reduction inquiry to reduce the performance level $L_i$ when a performance level reduction is available, and executing an outcome of the performance level reduction inquiry to execute obstacle avoidance when a performance level reduction is not available.

In accordance with yet one other embodiment of the present disclosure is a method of executing scanning logic for a materials handling vehicle, the method comprising moving the materials handling vehicle and materials handled by the materials handling vehicle along a travel path in a warehouse at a vehicle speed $S_C$ towards a destination, the materials handling vehicle comprising a steering mechanism, materials handling hardware, a vehicle drive mechanism, a user interface, and an obstacle scanning tool, wherein the steering mechanism, materials handling hardware, vehicle drive mechanism, and user interface facilitate movement of the materials handling vehicle and materials handled along the travel path, and the obstacle scanning tool comprises obstacle scanning hardware and a path filter. The method further comprises establishing a scan field through use of the obstacle scanning hardware of the obstacle scanning tool, establishing a filter field $F_i$ through use of the path filter of the obstacle scanning tool, scanning with the obstacle scanning tool for obstacles in the filter field $F_i$, executing a performance level reduction inquiry for obstacles detected in the filter field $F_i$, executing an outcome of the performance level reduction inquiry to reduce the performance level $L_i$ when a performance level reduction is available, and executing an outcome of the performance level reduction inquiry to execute obstacle avoidance when a performance level reduction is not available.

In accordance with one other embodiment of the present disclosure is a method of executing scanning logic for a materials handling vehicle comprising a towing vehicle and at least one trailer towed by the towing vehicle, the method comprising moving the materials handling vehicle and materials handled by the materials handling vehicle along a curved travel path in a warehouse towards a destination, the materials handling vehicle comprising a steering mechanism, materials handling hardware, a vehicle drive mechanism, a user interface, and an obstacle scanning tool. The steering mechanism, materials handling hardware, vehicle drive mechanism, and user interface facilitate movement of the materials handling vehicle and materials handled along the curved travel path. The obstacle scanning tool comprises obstacle scanning hardware and a path filter. The method further comprises establishing through a towing configuration of the materials handling vehicle a trailer turning radius $r_1$ that is smaller than a towing vehicle turning radius $r_2$ along curved portions of the curved travel path, establishing a scan field through use of the obstacle scanning hardware of the obstacle scanning tool, establishing a filter field through use of the path filter of the obstacle scanning tool, wherein the area of the filter field is skewed towards the inside edges of turns along the curved travel path to a degree that is sufficient to account for the smaller turning radius $r_1$ of the trailer and avoid collisions with obstacles along the inside edges of the turns along the curved travel path, and scanning with the obstacle scanning tool for obstacles in the filter field.

BRIEF DESCRIPTION OF THE DRAWINGS

The embodiments set forth in the drawings are illustrative and not intended to limit the subject matter defined by the claims. The following detailed description of the illustrative embodiments can be understood when read in conjunction with the following drawings, where like structure is indicated with like reference numerals and in which:

DETAILED DESCRIPTION

The following text sets forth a broad description of numerous different embodiments of the present disclosure. The description is to be construed to present examples only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. It should be understood that multiple combinations of the embodiments described and shown are contemplated and that a particular focus on one embodiment does not preclude its inclusion in a combination of other described embodiments. Numerous alternative embodiments could also be implemented, using either current technology or technology developed after the filing date of this patent, which would still fall within the scope of the claims.

Figure 1:
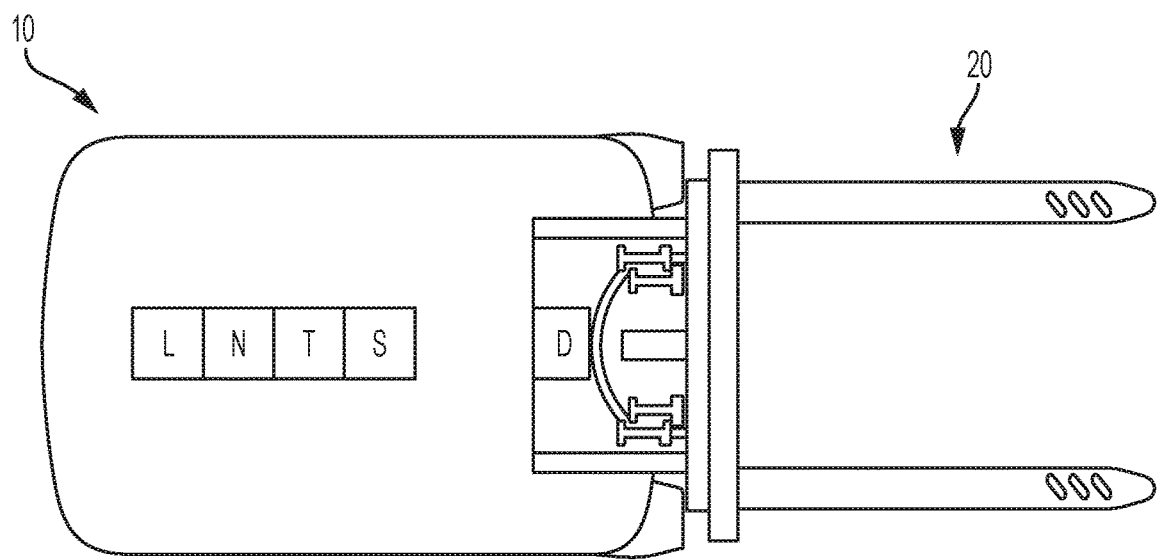
FIGS. 1 and 2 depict a materials handling vehicle according to one or more embodiments shown and described herein.
Figure 2:
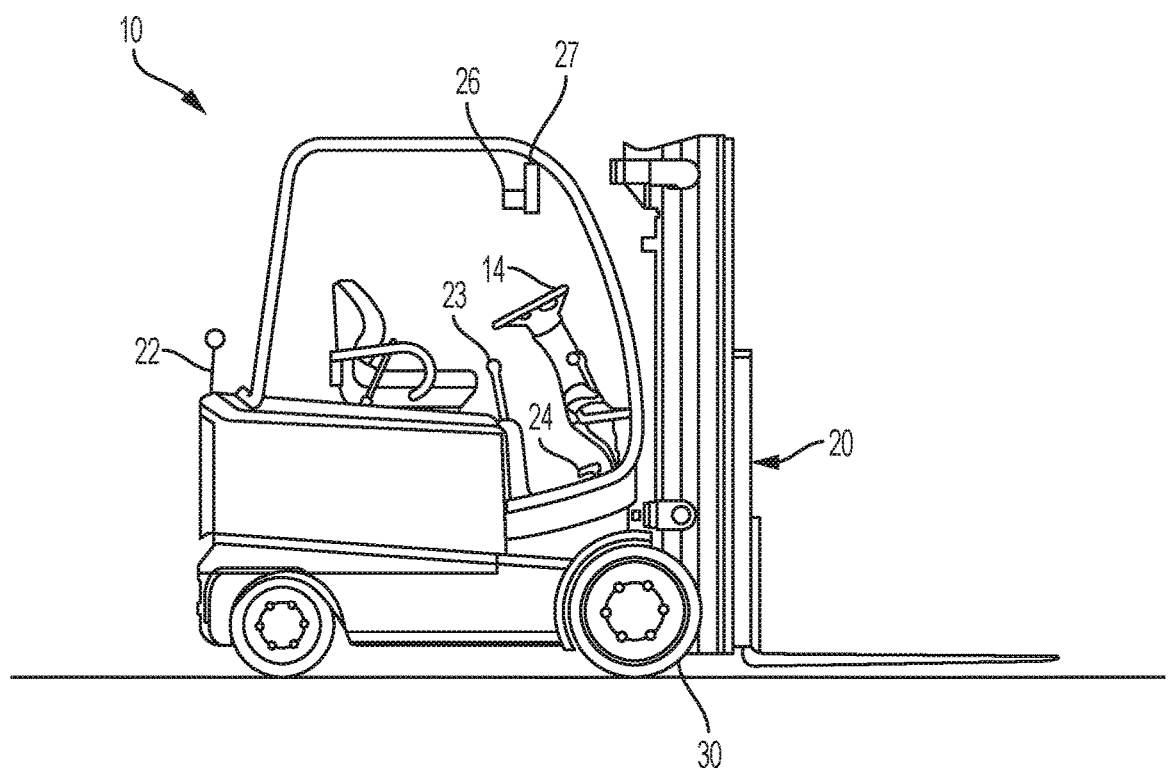

FIG. 1 illustrates a materials handling vehicle 10 in the form of a lift truck comprising conventional materials handling vehicle hardware, such as a steering mechanism S, materials handling hardware 20, and a vehicle drive mechanism, the details of which are beyond the scope of the present disclosure and may be gleaned from conventional and yet-to-be developed teachings in the materials handling vehicle literature—examples of which include U.S. Pat. No. 6,135,694, RE37215, 7,017,689, 7,681,963, 8,131,422, and 8,718,860, each of which is assigned to Crown Equipment Corporation. Referring to FIGS. 1-2, a materials handling vehicle 10 is shown comprising a vehicle body, materials handling hardware 20, one or more wheels 30, a vehicle drive mechanism D, a steering mechanism S, a localization module L, a navigation module N, and an obstacle scanning tool T. At least one wheel 30 may be part of the steering mechanism S. It should be understood that although several embodiments of the materials handling vehicle 10 are shown and described, the present disclosure contemplates any type of materials handling vehicle, including, for example, forklifts, lift trucks, tractors, tugger-trailer trains, etc.; including, but not limited to those powered industrial trucks identified by the United States Department of Labor, Occupational Safety & Health Administration (OSHA) in Class I—Electric Motor Rider Trucks, Class II—Electric Motor Narrow Aisle Trucks, Class III—Electric Motor Hand Trucks or Hand/Rider Trucks, Class IV—Internal Combustion Engine Trucks (Solid/Cushion Tires), Class V—Internal Combustion Engine Trucks (Pneumatic Tires), Class VI—Electric and Internal Combustion Engine Tractors, and Class VII—Rough Terrain Forklift Trucks.

The obstacle scanning tool T can be communicatively coupled to a vehicle controller 40 (FIG. 3) that controls operational functions of the materials handling vehicle 10 such as the functions of the materials handling hardware 20, vehicle drive mechanism D, and/or the steering mechanism S. In one embodiment, the materials handling vehicle hardware may comprise a travel distance sensor that is configured to measure a travel distance of the materials handling vehicle. For example, and not by way of limitation, the travel distance sensor may be an inertial sensor or odometry hardware, such as a load wheel sensor, a rotary encoder, a Hall Effect sensor, etc. The vehicle controller 40, the travel distance sensor, and conventional materials handling vehicle hardware are communicatively coupled together. In one embodiment, the materials handling vehicle 10 may comprise a location device L which transmits the current global location of the materials handling vehicle 10 to the vehicle controller 40.

Referring to FIG. 2, the materials handling vehicle 10 may comprise one or more user interfaces that permit an operator to interface with the control functions of the materials handling vehicle. For example, and not by way of limitation, suitable user interfaces include, but are not limited to, conventional or yet-to-be developed operator compartment control devices, such as a hand-operated control device 23 for controlling the materials handling hardware 20, a foot-operated vehicle speed control device 24 operatively coupled to the vehicle drive mechanism, a touch screen hardware control interface 26, a steering control device 14 operatively coupled to the steered wheels of the materials handling vehicle 10, or combinations thereof. It should be understood by those skilled in the art that the touch screen hardware control interface 26 may be integral to, or otherwise part of, a vehicle display 27 but it is not limited to being part of the display 27. The touch screen hardware control interface 26 may be a distinct device separate from the display 27. The materials handling hardware 20 may be any type of conventional or yet-to-be developed hardware equipped to handle materials, is typically configured to facilitate the storage and retrieval of goods, and may include, but is not limited to, a set of fork tines, a container handler, a turret with forks, a pantograph, a telescopic handler, and the like.

In one embodiment, the user interface may comprise an antenna 22 or other type of automated interface with an external or remote control device, which may be used to issue commands to the materials handling vehicle 10, make changes to the vehicle controller 40, or otherwise remotely control the materials handling vehicle 10. The antenna is configured to wirelessly communicatively couple the materials handling vehicle 10 to a remote computer. Alternatively, or additionally, other types of automated interfaces may be provided, such as, for example, input/output ports, such as RS-232 connectors, USB ports, or the like. These types of interfaces may be provided to facilitate a hard wired connection between the materials handling vehicle 10 and a remote computer such as a laptop. In these types of embodiments, user input through user interfaces in the operator compartment may not be required to control the materials handling vehicle hardware and it is the vehicle controller 40 coupled to the materials handling vehicle hardware (e.g., the steering mechanism S, the materials handling hardware 20, the vehicle drive mechanism D, and/or the like) which issues control commands to the materials handling vehicle hardware. For example, and not by way of limitation, suitable automated interfaces may facilitate the control and functions of the materials handling vehicle 10 without the need of input commands through the operator compartment user interfaces if the materials handling vehicle 10 is an automated guided vehicle.

The obstacle scanning tool T may be embodied in hardware and/or in software (including firmware, resident software, micro-code, etc.). In one embodiment, the obstacle scanning tool T is embodied in software and hardware. For example, referring to FIG. 3, the obstacle scanning tool T may comprise a program embodied in a vehicle controller 40, which comprises at least one processor 205 and a non-transitory computer-readable medium 210 communicatively coupled through a local interface 215. Alternatively, suitable scanning tool software may be stored in a computer-usable or computer-readable medium accessible by a vehicle controller 40 (e.g., over a network).

Figure 4:
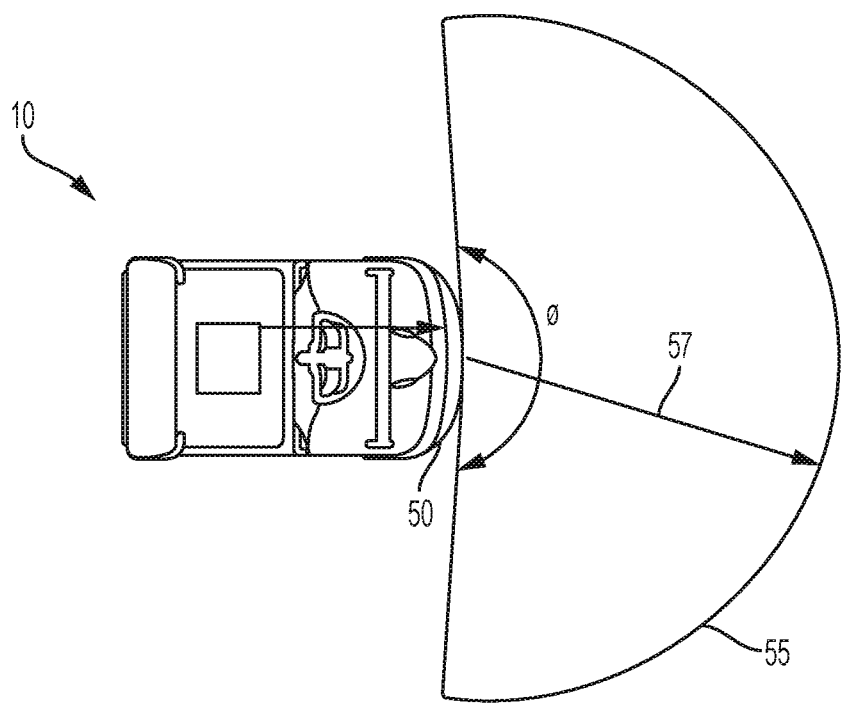
FIG. 4 depicts a scan field according to one or more embodiments shown and described herein.
Figure 5:
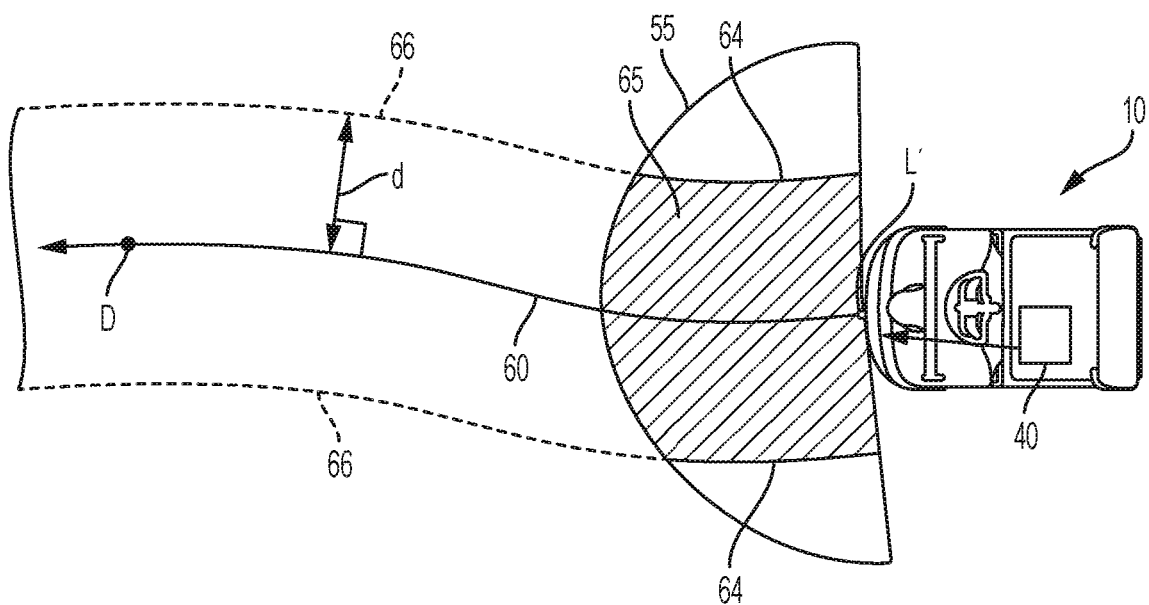
FIG. 5 depicts a scan field and a filter field along a materials handling vehicle travel path according to one or more embodiments shown and described herein.

As is illustrated in FIGS. 1 and 4-5, the obstacle scanning tool T comprises obstacle scanning hardware establishing a scan field 55, and one or more filters which operate on the scan field 55 in the manner described below. For example, referring to FIG. 7, the one or more filters may include a path filter 64 establishing a filter field 65, and a performance filter 71 establishing a performance field ($P_i$) 70, 70'. The obstacle scanning tool 40 is configured to indicate the presence of obstacles in the filter field 65 and the performance field ($P_i$) 70, 70'. It is noted that, although the path filter 64 and the performance filter 71 are part of the obstacle scanning tool, they are represented in FIGS. 5, 7, 10, and 11 by referring to respective portions of the scan field 55 that correspond to the functionality of the path filter 64 and the performance filter 71. For example, in FIG. 7, the performance filter 71 is illustrated by referring to the outer bounds of the performance field 70, 70' within the scan field 55 of the obstacle scanning tool 40. Further, the path filter 64 is illustrated by referring to the outer bounds of the filter field 65 within the scan field 55 of the obstacle scanning tool 40.

Referring back to FIG. 3, a computer-usable or the non-transitory computer-readable medium 210 may be any non-transitory medium that can contain, store, communicate, propagate, or transport software for use by, or in connection with, the vehicle controller 40. The non-transitory computer-readable medium 210 may be, for example but not limited to, an electronic, magnetic, optical, electromagnetic, infrared, or semiconductor system, apparatus, device, or propagation medium. More specific examples (a non-exhaustive list) of the non-transitory computer-readable medium 210 would include the following volatile and non-volatile examples: an electrical connection having one or more wires, a computer diskette, a random access memory (RAM) (including SRAM, DRAM, and/or other types of RAM), a read-only memory (ROM), an erasable programmable read-only memory (EPROM or Flash memory), secure digital (SD) memory, registers, one or more optical fibers, a compact disc read-only memory (CD-ROM), or a digital video disc read-only memory (DVD-ROM). Note that the non-transitory computer-readable medium 210 could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In other words, non-transitory computer-readable medium 210 may include those computer-readable mediums that are not signals per se. As discussed hereinbefore, in one embodiment, the non-transitory computer-readable mediums 210 resides within the vehicle controller 40 and in another embodiment, the non-transitory computer-readable mediums resides external to the vehicle controller 40.

Additionally, the non-transitory computer-readable medium 210 may be configured to store operating logic 230 and executable logic 235. The operating logic 230 may include an operating system, basic input output system (BIOS), and/or other hardware, software, and/or firmware for operating the vehicle controller 40. The executable logic 235 comprises the obstacle scanning tool logic 240 which may each comprise a plurality of different pieces of logic, each of which may be embodied, as a non-limiting example, as a computer program, firmware, and/or hardware. Computer program code for carrying out the obstacle scanning tool of the present disclosure may be written in any form of programming language available to one skilled in the art, which includes, for example, a high-level programming language such as C or C++, interpreted languages, assembly language, or micro-code depending on the specific goals of the computer program code and the computing environment in which the computer program code is executed. However, it should be understood that the software embodiments of the present disclosure do not depend on implementation with a particular programming language.

The local interface 215 may comprise as a bus or other communication interface to facilitate communication among the components of the vehicle controller 40. The processor 205 may include any processing component operable to receive and execute instructions (such as from the data storage 245 and/or non-transitory computer-readable medium 210). The input/output hardware 220 may include and/or be configured to interface with a monitor, positioning system, keyboard, mouse, printer, image capture device, microphone, speaker, sensors, gyroscope, compass, and/or other device for receiving, sending, and/or presenting data. The network interface hardware 225 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the vehicle controller 40 and other computing devices through an automated interface, such as the antenna 22 illustrated in FIG. 1. In one embodiment, the processor 205 may include and/or be coupled to a graphical processing unit (GPU). It will be further appreciated that the functionality of any or all of the program modules may also be implemented using discrete hardware components, one or more application specific integrated circuits (ASICs), or a programmed digital signal processor, or microcontroller.

The vehicle controller 40 may comprise data storage 245. Data storage may be a subset of the non-transitory computer-readable medium 210 or it may be a separate and distinct component within the vehicle controller 40. The data storage 245 may comprise one or more data sets for use by the operating logic 230 and/or the executable logic 235. The data sets may comprise configuration data 250, environmental data 255, and vehicle data 260.

Figure 3:
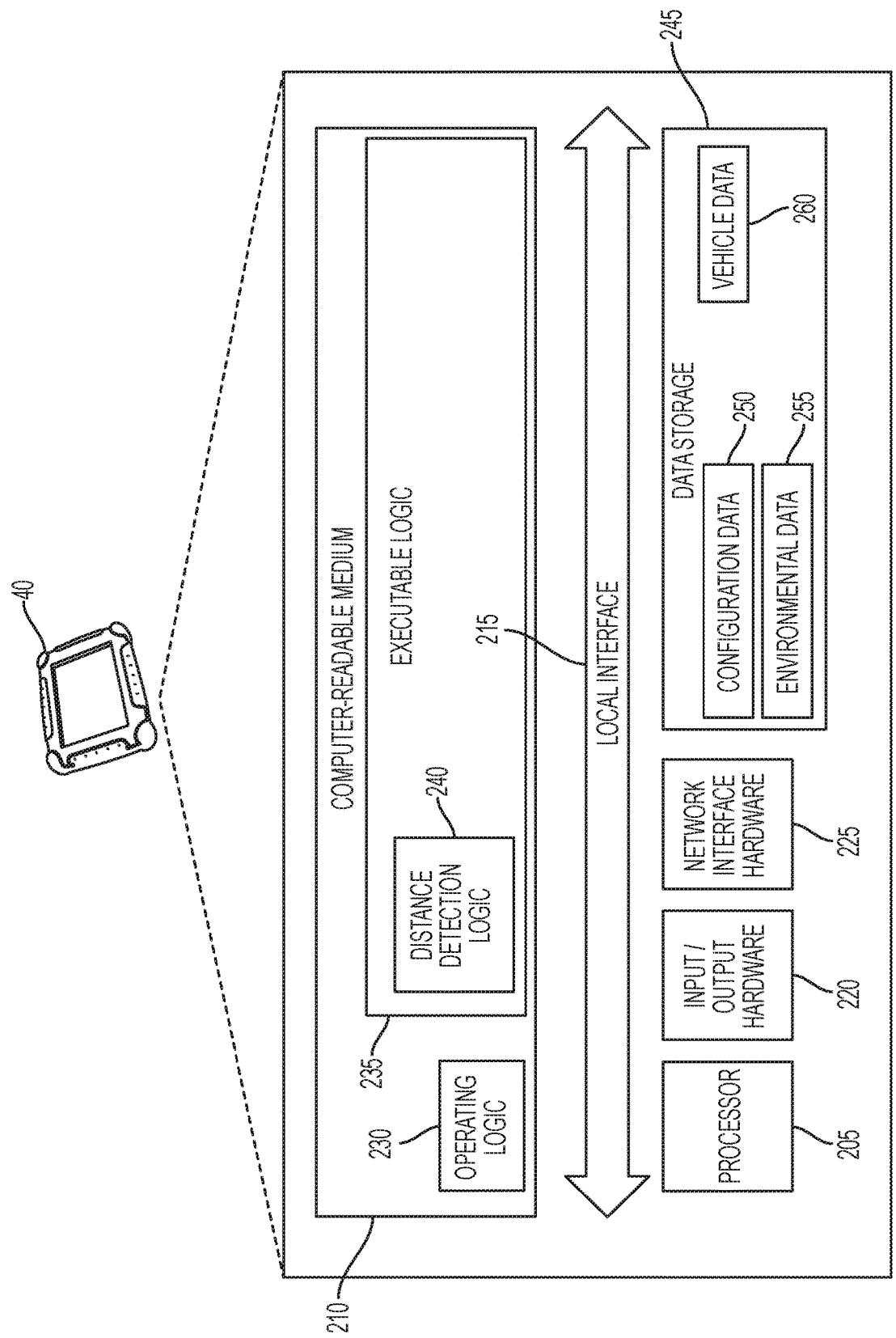
FIG. 3 depicts a computing environment according to one or more embodiments shown and described herein.

Note that FIG. 3 and the associated discussions provide a brief description of a suitable computing environment in which the present disclosure may be implemented. Although not required, aspects of the software are described in the general context of computer-executable instructions, such as routines executed by a general-purpose computer, e.g., stationary and mobile computers. Those skilled in the relevant art will appreciate that the software can be practiced with other communications, data processing, or computer system configurations, including: Internet appliances, handheld devices (including personal digital assistants (PDAs)), wearable computers, all manner of cellular or mobile phones, multi-processor systems, microprocessor-based or programmable consumer electronics, set-top boxes, network PCs, mini-computers, mainframe computers, server computers, and the like. Indeed, the terms "computer" and the like are generally used interchangeably herein, and refer to any of the above devices and systems, as well as any data processor. Aspects of the software can be embodied in a special purpose computer or data processor that is specifically programmed, configured, or constructed to perform one or more of the computer-executable instructions explained in detail herein. Aspects of the software can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Indeed, computer implemented instructions, data structures, screen displays, and other data under aspects of the software may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

FIG. 4 depicts a materials handling vehicle 10 comprising a laser scanner 50 communicatively coupled to the obstacle scanning tool 40 and the vehicle controller 40. It is contemplated that the laser scanner 50 may be a 2-dimensional laser scanner, a planar laser scanner, a 3-dimensional laser scanner, and the like. Non-limiting examples of the laser scanner 50 include the SICK S3000 laser scanner. The laser scanner 50 comprises a scan field 55 defined by a scan arc Ø and scan range 57. The scan field 55 represents the full range of the laser scanner 50 and the complete scope of the scan data transmitted to the vehicle controller 40. In one embodiment, the scan arc Ø and scan range 57 are fixed. In one embodiment, the scan arc Ø and scan range 57 are variable and set by the obstacle scanning tool or by physical adjustments to the laser scanner 50. In all embodiments, the laser scanner 50 is able to collect radial distance measurements of objects within the scan field 55 and generate scan data which is transmitted to the vehicle controller 40.

Referring now to FIG. 5, the materials handling vehicle 10 can be configured and operated to follow a path 60. In one embodiment, the path 60 is determined based on user inputs at the user interface of the materials handling vehicle 10. In one embodiment, the path 60 is predetermined based on a predetermined plan (e.g., global positions along the path 60) and may be stored as environmental data 255 (FIG. 3) in the obstacle scanning tool T. In both embodiments, the obstacle scanning tool T applies a path filter 64 to the scan data to identify if there are any obstacles within a filter field 65 established by the path filter 64. In other words, the filter field 65 is an area along the path 60 in which the obstacle scanning tool T processes the scan data from the laser scanner 50 to identify any obstacles along the path 60 of the materials handling vehicle 10. Thus, the obstacle scanning tool T processes scan data from the obstacle scanning hardware to identify obstacles along the travel path 60 and in the filter field 65. For example, the filter field 65 is an area along the path 60, within the scan field 55, in which the obstacle scanning tool T processes the scan data from the laser scanner 50 to identify any obstacles along the path 60 of the materials handling vehicle 10 in the filter field 65.

As the materials handling vehicle progresses along the path 60, the filter field 65 changes to adapt to changes in travel direction, travel speed, steer angle, anticipated travel direction, anticipated travel speed, anticipated steer angle, and materials handling vehicle weight. The path 60 in FIG. 5 illustrates a slight bend and an anticipated path filter 66 bounding the path 60 outside of the scan field 55. In one embodiment, the anticipated path filter 66 is configured to bound to the travel path 60 outside of the scan field 55 at a fixed distance d from the path 60. In one embodiment, the distance d may vary based on the anticipated travel direction, the anticipated travel speed, and the anticipated steer angle at, for example, a destination D along the path 60. For clarity, destination D is position along the path 60 that the materials handling vehicle 10 is anticipated to be at as the materials handling vehicle traverses along the path 60.

Figure 6:
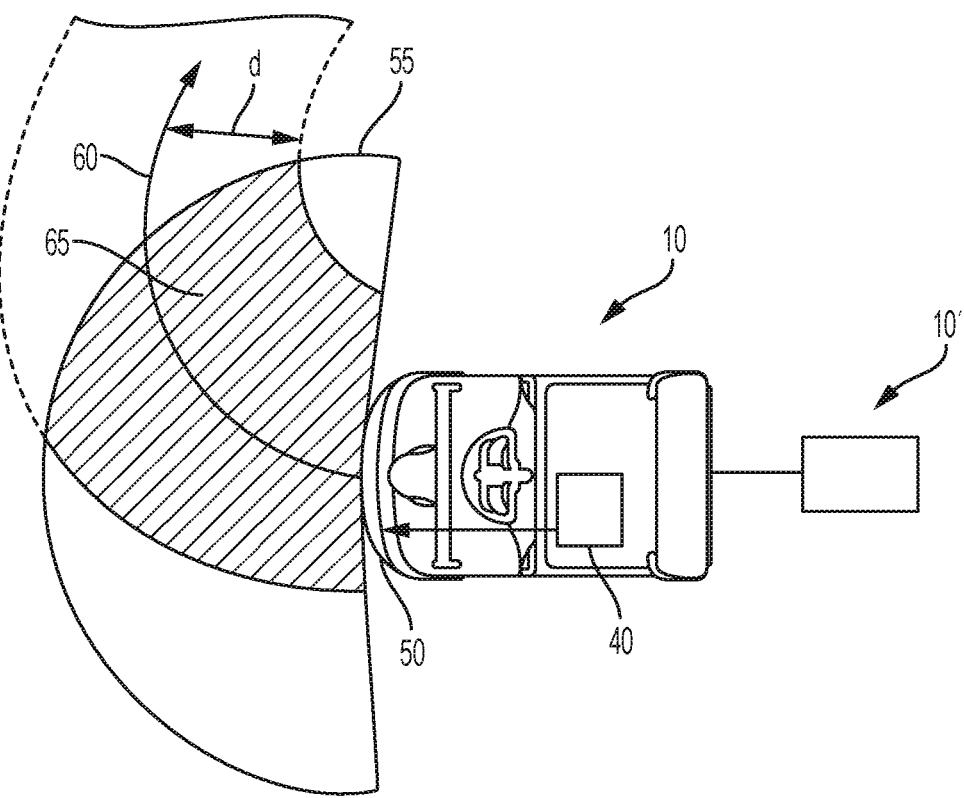
FIG. 6 depicts a scan field and filter field along a turn in a materials handling vehicle travel path according to one or more embodiments shown and described herein.

FIG. 6 illustrates how differing portions of the scan data from the scan field 55 are used by the obstacle scanning tool T to change the filter field 65 to accommodate transitions in the path 60 of the materials handling vehicle 10. It is contemplated that the distance d from the path 60 may vary on both sides of the path 60. For example, and not by way of limitation, the materials handling vehicle 10 may have equipment or a load extending on one side and not the other. The obstacle scanning tool T will modify the filter field 65 to account for any obstacles which may come into proximity to, or make contact with, the equipment or load extending from the side of the materials handling vehicle 10. In one embodiment, if the materials handling vehicle 10 is towing trailers, the obstacle scanning tool T will change the filter field 65 to account for varying widths (i.e., a maximum width) of the trailers.

In addition to those embodiments, FIG. 6 illustrates the materials handling vehicle 10 turning and the associated filter field 65. It is contemplated that the materials handling vehicle 10 of FIG. 6 is towing several trailers such that the materials handling vehicle 10 includes a towing vehicle and at least one trailer 10' towed by the towing vehicle. As illustrated in FIG. 6, the steering mechanism S, materials handling hardware, vehicle drive mechanism D, and user interface facilitate movement of the materials handling vehicle 10 and materials handled by the materials handling vehicle along a curved travel path 60 in a warehouse towards a destination. The filter field 65 has increased the filter field 65 area on the inside of the turn when compared to the area of the filter field 65 on the outside of the turn along the path 60. The increase in area on the inside of the turn is to account for the tighter turning radiuses of the towed trailers 10'. Thus, a towing configuration of the materials handling vehicle 10 establishes a trailer turning radius $r_1$ that is smaller than a towing vehicle turning radius $r_2$ along curved portions of the curved travel path 60.

The obstacle scanning tool T executes obstacle scanning logic to use the path filter 64 to establish the filter field 65 such that the area of the filter field 65 is skewed towards the inside edges of turns along the curved travel path 60 to a degree that is sufficient to account for the smaller turning radius $r_1$ of the trailer 10' and avoid collisions with obstacles along the inside edges of the turns along the curved travel path 60. In embodiments, the at least one trailer 10' comprises a plurality of trailers 10', and an obstacle for each trailer 10' along the inside edges of the turns along the curved travel path 60 comprises one of the towing vehicle and another trailer of the plurality of trailers 10', and the filter field 65 is skewed toward the inside edges of turns along the curved travel path 60 to avoid collisions between the towing vehicle and one of the plurality of trailers 10' and between one of the plurality of trailers 10' with another one of the plurality of trailers 10'.

Figure 7:
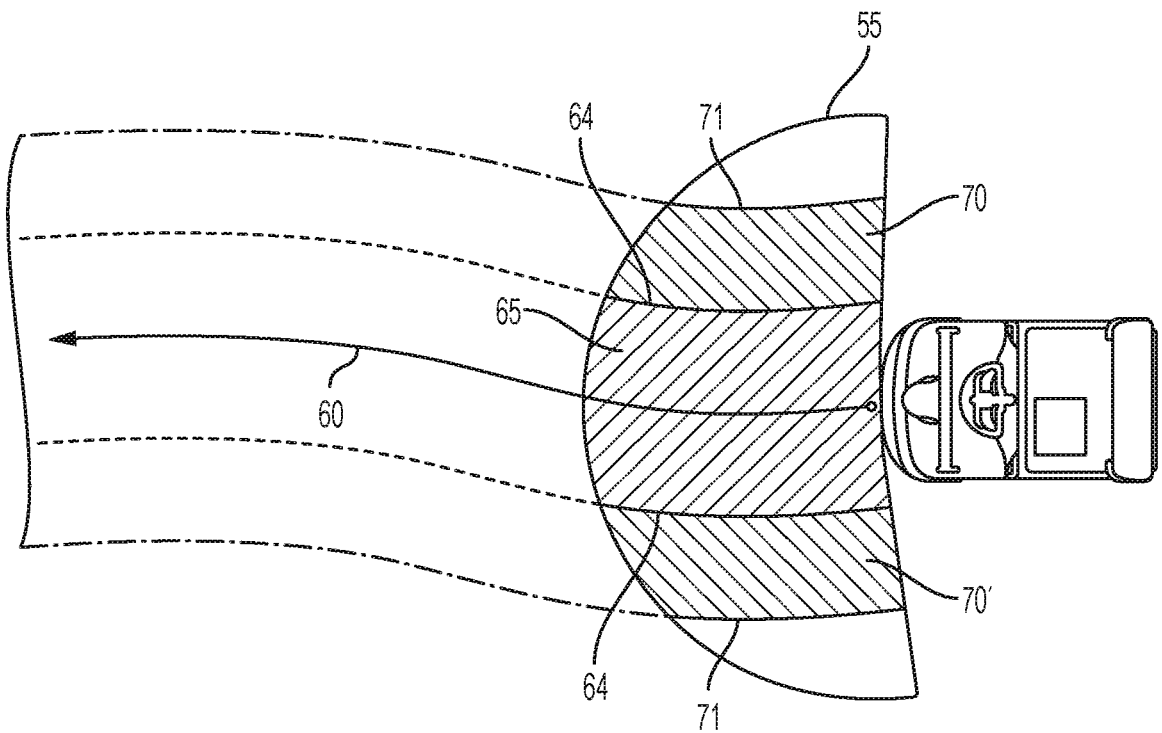
FIG. 7 depicts a scan field, a filter field, and a performance field along a materials handling vehicle travel path according to one or more embodiments shown and described herein.

FIG. 7 illustrates the filter field 65 along with performance field ($P_i$) 70, 70', which is located along the path 60. FIG. 7 further illustrates that the filter field 65 is disposed within the performance field ($P_i$) 70, 70'. In this embodiment, scan data from the performance field ($P_i$) 70, 70' is processed by the obstacle scanning tool T along with the data associated with the filter field 65. The respective portions of the performance field ($P_i$) 70, 70' on opposite sides of the travel path 60 may vary in size and shape from each other and are not limited to following the contours of either the travel path 60 or the filter field 65.

As a non-limiting example, the materials handling vehicle 10 may include the steering mechanism S, materials handling hardware 20, the vehicle drive mechanism D, a user interface, and an obstacle scanning tool T communicatively coupled to the laser scanner 50. The steering mechanism S, materials handling hardware 20, vehicle drive mechanism D, and user interface facilitate movement of the materials handling vehicle 10 and materials handled by the materials handling vehicle 10 along a travel path 60 in a warehouse at a vehicle speed $S_C$ towards a destination D. A method of executing scanning logic for a materials handling vehicle 10 may thus include moving the materials handling vehicle 10 and materials handled by the materials handling vehicle 10 along the travel path 60 in the warehouse at the vehicle speed $S_C$ towards the destination D and executing at least obstacle avoidance through the obstacle scanning tool T for obstacles detected in the filter field 65 as described herein.

Figure 8:
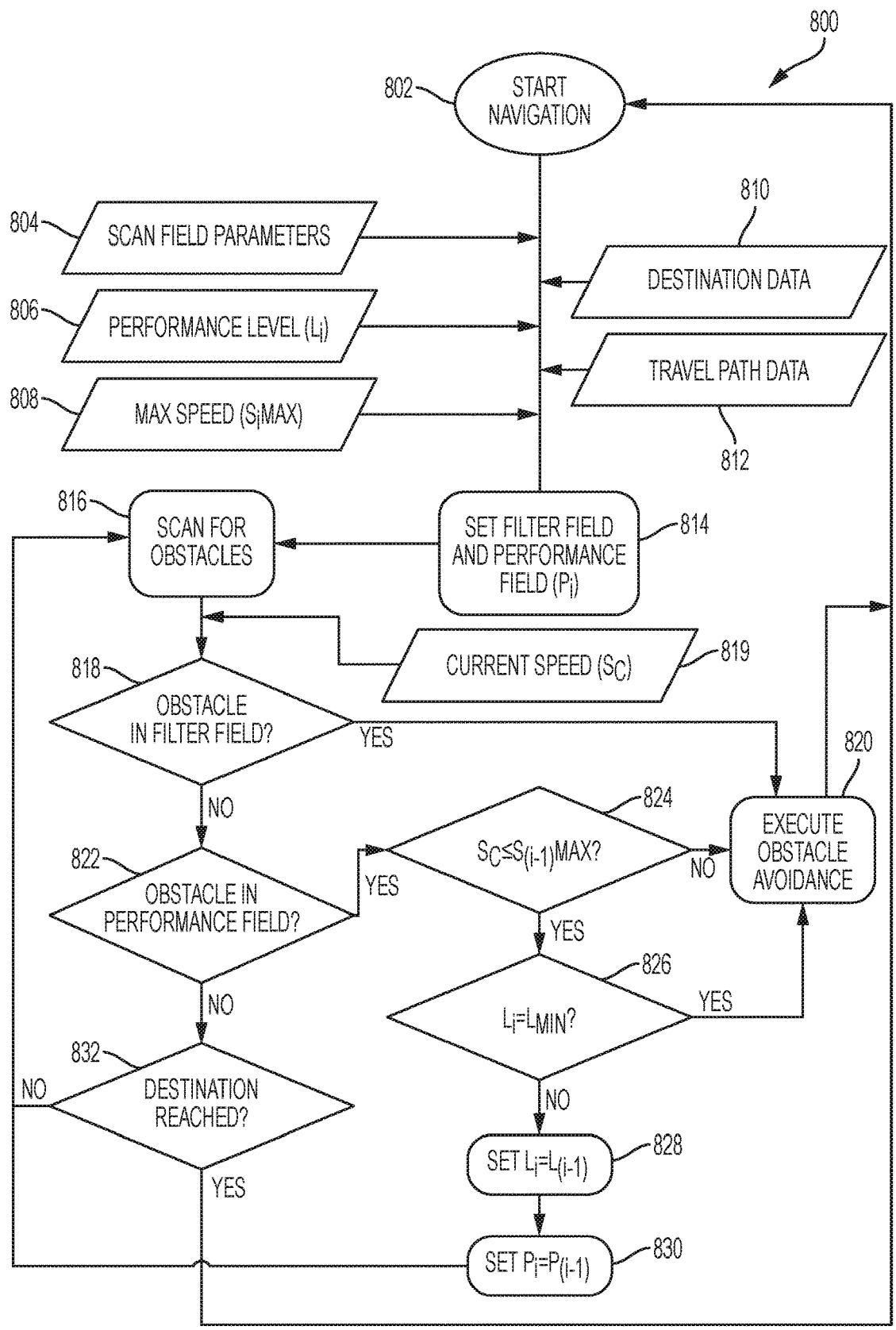
FIG. 8 depicts a flow chart illustrating a process in which a performance field may be reduced while scanning for obstacles according to one or more embodiments shown and described herein.

Referring to FIG. 8, a process 800 is illustrated in which a filter field 65 and a performance field 70, 70' that may be reduced are set and utilized. The obstacle scanning tool T may include obstacle scanning hardware such as the laser scanner 50 establishing a scan field 55, the path filter 64 establishing a filter field 65, and the performance filter 71 establishing a performance field $P_i$, and is configured to indicate the presence of obstacles in the filter field and the performance field $P_i$. In block 802 of the process 800, navigation of the materials handling vehicle 10 is started. A plurality of inputs 804-812 are received by the obstacle scanning tool T, such as scan field parameters as an input 804 that includes the scan field 55, an input performance level $L_i$ as an input 806, a maximum speed $S_i$Max associated with the performance level $L_i$ as an input 808, destination data as an input 810, and travel path data as an input 812. In embodiments, the performance level $L_i$ is input as the input 806 at the user interface or in response to an external stimulus that may be, for example, a remote command or an environment trigger such as a radio-frequency identification (RFID) tag.

In block 814 of the process 800, the filter field 65 and the performance field $P_i$ are set. For example, the obstacle scanning tool T executes obstacle scanning logic to establish the filter field 65. The obstacle scanning tool T executes obstacle scanning logic further to establish the performance field $P_i$ in response to an input performance level $L_i$.

In block 816 of the process 800, the process 800 scans for obstacles. For example, the obstacle scanning tool T executes obstacle scanning logic to scan for obstacles in the filter field 65 and the performance field $P_i$. In block 818, the process 800 determines whether an obstacle is detected in the filter field 65. The process 800 includes, prior to block 818, receiving an input 817 of a current speed $S_c$ of the materials handling vehicle 10 along the travel path 60. If an obstacle is detected in the filter field 65 in block 818, obstacle avoidance in block 820 is executed. In embodiments, obstacle avoidance is executed using the steering mechanism S and/or the vehicle drive mechanism D. Further, obstacle avoidance may include vehicle slowing or stopping as well as navigation of the materials handling vehicle 10 around an obstacle.

If an obstacle is not detected in the filter field 65, the process 800 determines in block 822 whether an obstacle is detected in the performance field $P_i$. In embodiments, the obstacle scanning tool T executes obstacle scanning logic to execute a performance level reduction inquiry for obstacles detected in the performance field $P_i$ wherein outcomes of the performance level reduction inquiry comprise reduction of the performance level $L_i$ in block 828 described below when a performance level reduction is available and execution of obstacle avoidance in block 820 when a performance level reduction is not available. For example, if an obstacle is detected in the performance field $P_i$ in block 822, the performance level reduction inquiry of the process 800 determines in block 824 whether the current speed $S_c$ of the materials handling vehicle 10 received as the input 817 is less than or equal to a maximum speed $S_{(i-1)}$Max associated with a performance level $L_{(i-1)}$.

In other words, the performance level reduction inquiry comprises a current vehicle speed query to confirm that the current speed $S_c$ of the materials handling vehicle 10 along the travel path 60 is not greater than a maximum speed $S_i$Max associated with the performance level $L_i$. The obstacle scanning tool T conditions reduction of the performance level $L_i$ on a determination that the current speed $S_c$ is not greater than a maximum speed $S_i$Max.

Further, the performance level reduction inquiry includes in block 826 a current performance level query to confirm that the performance level $L_i$ is greater than a minimum performance level $L_{Min}$ associated with the materials handling vehicle 10. Based on the determination in block 824 that the current speed $S_c$ of the materials handling vehicle 10 received as the input 817 is less than or equal to a maximum speed $S_{(i-1)}$Max associated with a performance level $L_{(i-1)}$, and based on the determination in block 826 that the performance level $L_i$ is greater than a minimum performance level $L_{Min}$, the performance level reduction inquiry of the process 800 reduces the performance level $L_i$ to a next, reduced level, and thus sets the performance level $L_i$ to a performance level $L_{(i-1)}$ in block 828. Accordingly, in block 830, the performance field $P_i$ associated with the performance level $L_i$ is reduced and set to a performance field $P_{(i-1)}$ associated with the performance level $L_{(i-1)}$.

The obstacle scanning tool T may include a plurality of performance filters establishing a respective plurality of performance fields. Further, the performance field $P_{(i-1)}$ includes a maximum speed $S_{(i-1)}$ Max associated with the performance level $L_{(i-1)}$ and is disposed within the performance field $P_i$. Reduction of the performance level $L_i$ to the performance level $L_{(i-1)}$ includes a corresponding reduction in the performance field $P_i$ to the performance field $P_{(i-1)}$. Thus, the performance field $P_i$ associated with a current performance level $L_i$ may be decreased to a next lower performance level $L_{(i-1)}$ less than the current performance level $L_i$ such that behavioral rules allow for the driving restrictions to be increased (i.e., decrease or reduce speed, etc.) to match the next performance level $L_{(i-1)}$. The process 800 returns to block 816 to scan for obstacles and repeat the following process block steps as described herein.

However, based on a determination that the current speed $S_c$ of the materials handling vehicle 10 received as the input 817 is greater than the maximum speed $S_i$Max associated with a performance level $L_i$, and a further determination in block 824 that the current speed $S_c$ of the materials handling vehicle 10 is greater than the maximum speed $S_{(i-1)}$Max associated with a performance level $L_{(i-1)}$, the process 800 advances to block 820 to execute obstacle avoidance. At the block 820, the process 800 may repeat the process steps starting from block 802.

Further, based on a determination in block 826 that the performance level $L_i$ is not greater than, but rather is equal to, a minimum performance level $L_{Min}$, the process 800 advances to block 820 to execute obstacle avoidance.

Additionally, if an obstacle is not detected in the performance field $P_i$ in block 822, the performance level reduction inquiry of the process 800 determines in block 832 whether a destination D has been reached. Based on a positive determination that the destination D has been reached, the process 800 may repeat the process steps starting from block 802. Based on a negative determination that the destination D has not yet been reached, the process 800 returns to block 816 to scan for obstacles.

Figure 9:
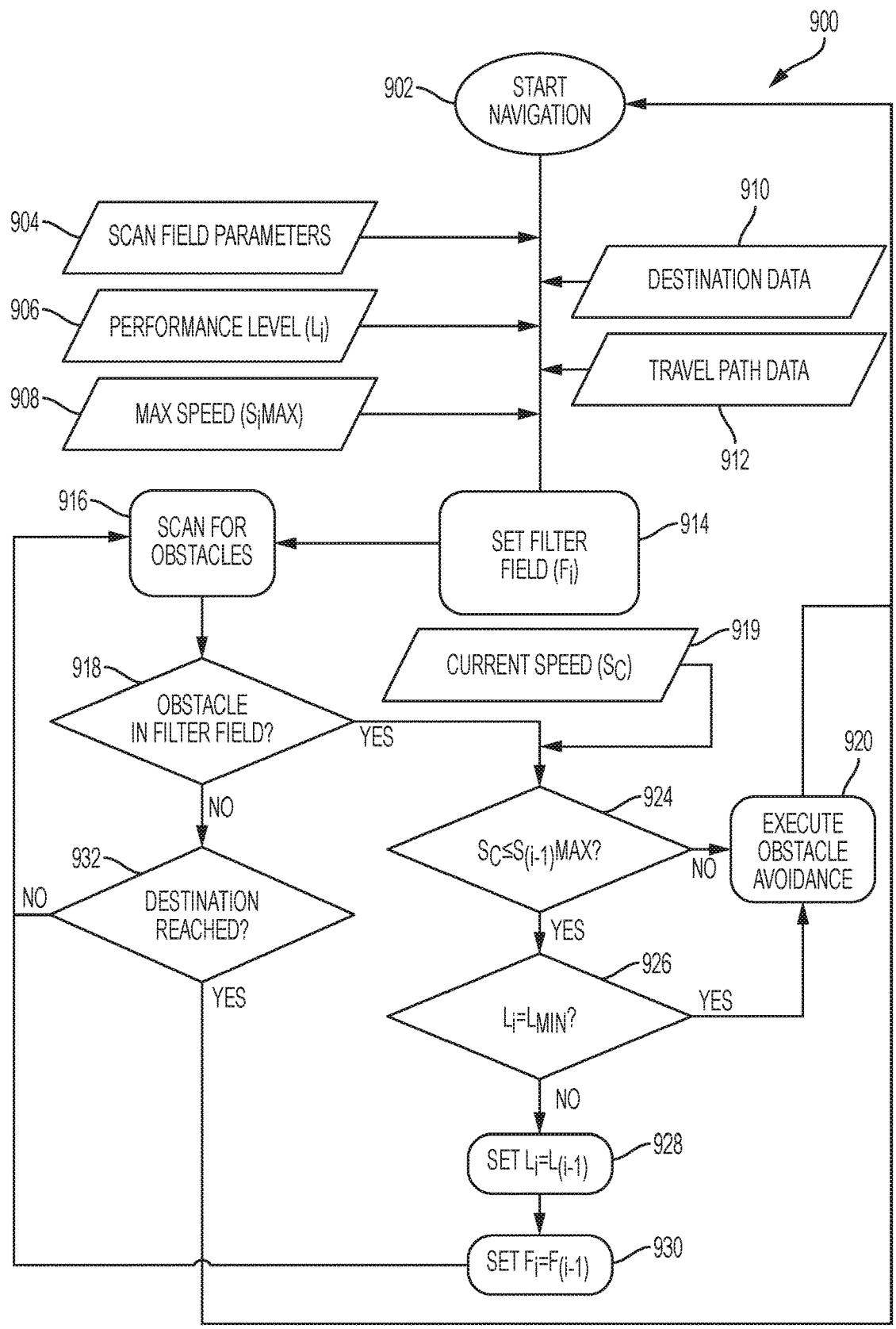
FIG. 9 depicts a flow chart in which a filter field may be reduced while scanning for obstacles according to one or more embodiments shown and described herein.

Referring to FIG. 9, a process 900 is illustrated in which a filter field 65 that may be reduced is set and utilized. The obstacle scanning tool T may include obstacle scanning hardware such as the laser scanner 50 establishing a scan field 55, the path filter 64 establishing a filter field $F_i$, and is configured to indicate the presence of obstacles in the filter field $F_i$. In block 902 of the process 900, navigation of the materials handling vehicle 10 is started. A plurality of inputs 904-912 are received by the obstacle scanning tool T, such as scan field parameters as an input 904 that includes the scan field 55, an input performance level $L_i$ as an input 906, a maximum speed $S_i$Max associated with the performance level $L_i$ as an input 908, destination data as an input 910, and travel path data as an input 912.

In block 914 of the process 900, the filter field $F_i$ is set. For example, the obstacle scanning tool T executes obstacle scanning logic to establish the filter field $F_i$.

In block 916 of the process 900, the process 900 scans for obstacles. For example, the obstacle scanning tool T executes obstacle scanning logic to scan for obstacles in the filter field $F_i$. In block 918, the process 900 determines whether an obstacle is detected in the filter field $F_i$.

If an obstacle is detected in the filter field $F_i$ in block 918, the process 900 receives an input 919 of a current speed $S_c$ of the materials handling vehicle 10 along the travel path 60. In embodiments, the obstacle scanning tool T executes obstacle scanning logic to execute a performance level reduction inquiry for obstacles detected in the filter field $F_i$ wherein outcomes of the performance level reduction inquiry comprise reduction of the performance level $L_i$ in block 928 described below when a performance level reduction is available and execution of obstacle avoidance in block 920 when a performance level reduction is not available. For example, if an obstacle is detected in the filter field $F_i$ in block 918, the performance level reduction inquiry of the process 900 determines in block 924 whether the current speed $S_c$ of the materials handling vehicle 10 received as the input 919 is less than or equal to a maximum speed $S_{(i-1)}$ Max associated with a performance level $L_{(i-1)}$.

In other words, the obstacle scanning tool T conditions reduction of the performance level $L_i$ on a determination in block 924 that the current speed $S_c$ is not greater than a maximum speed $S_i$Max and is not greater than a maximum speed $S_{(i-1)}$Max associated with a performance level $L_{(i-1)}$. Further, the performance level reduction inquiry includes in block 826 a current performance level query to confirm that the performance level $L_i$ is greater than a minimum performance level $L_{Min}$ associated with the materials handling vehicle 10. Based on the determination in block 924 that the current speed $S_c$ of the materials handling vehicle 10 received as the input 919 is less than or equal to a maximum speed $S_{(i-1)}$Max associated with a performance level $L_{(i-1)}$, and based on the determination in block 926 that the performance level $L_i$ is greater than a minimum performance level $L_{Min}$, the performance level reduction inquiry of the process 900 reduces the performance level $L_i$ to a next, reduced level, and thus sets the performance level $L_i$ to a performance level $L_{(i-1)}$ in block 928. Accordingly, in block 930, the filter field $F_i$ associated with the performance level $L_i$ is set to a next, reduced filter field $F_{(i-1)}$ associated with the performance level $L_{(i-1)}$. The process 900 returns to block 916 to scan for obstacles and repeat the following process block steps as described herein.

However, based on a determination that the current speed $S_c$ of the materials handling vehicle 10 received as the input 919 is greater than the maximum speed $S_iMax$ associated with a performance level $L_i$, and a further determination in block 924 that the current speed $S_c$ of the materials handling vehicle 10 is greater than the maximum speed $S_{(i-1)}Max$ associated with a performance level $L_{(i-1)}$, the process 900 advances to block 920 to execute obstacle avoidance. At the block 920, the process 900 may repeat the process steps starting from block 902. Further, based on a determination in block 926 that that the performance level $L_i$ is not greater than, but rather is equal to, a minimum performance level $L_{Min}$, the process 900 advances to block 820 to execute obstacle avoidance.

Additionally, if an obstacle is not detected in the filter field $F_i$ in block 918, the performance level reduction inquiry of the process 900 determines in block 932 whether a destination D has been reached. Based on a positive determination that the destination D has been reached, the process 900 may repeat the process steps starting from block 902. Based on a negative determination that the destination D has not yet been reached, the process 900 returns to block 916 to scan for obstacles.

Figure 10:
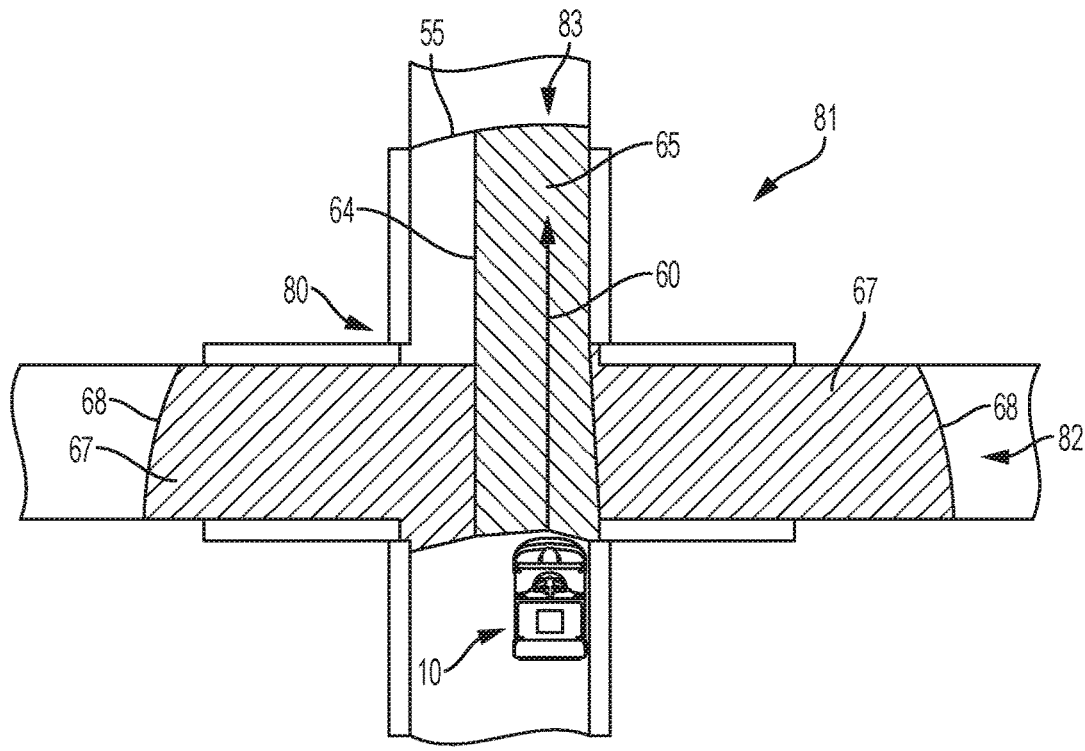
FIG. 10 depicts a scan field and an overlay field at an intersection along a materials handling vehicle travel path according to one or more embodiments shown and described herein.
Figure 11:
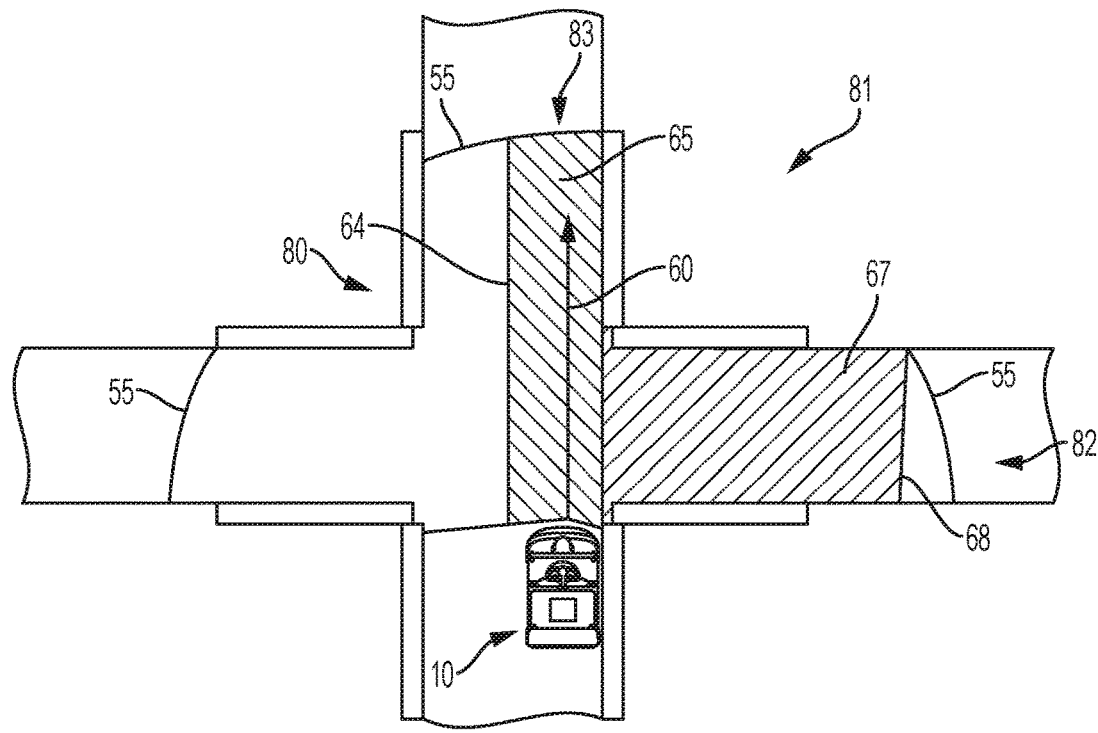
FIG. 11 depicts a scan field and an overlay field at an intersection along a materials handling vehicle travel path according to another embodiment as shown and described herein.

FIGS. 10 and 11 illustrate the use of filter fields 65 and one or more overlay fields 67 being applied to the scan data at an intersection 80 within an industrial environment 81. In FIG. 10, the filter field 65 encompasses the path 60 as discussed hereinbefore. As discussed hereinafter, it may be desired to identify an obstacle along the path 60 as well as any obstacles within the intersection 80 which includes obstacles approaching along the first aisle path 82 and the second aisle path 83. For example, and not by way of limitation, intersection rules may be used by the obstacle scanning tool T (FIG. 1) such as yield or stop rules which require checking for vehicles, objects, pedestrians, etc. approaching the intersection from either the first aisle path 82 (right or left approach) or the second aisle path 83 (in front or behind (passing) approach). One or more overlay filters 68 may be used in addition to the path filter 64 by the obstacle scanning tool T to identify obstacles in the overlay field 67 of the scan data to operate the materials handling vehicle 10 in accordance with the intersection rules. Thus, one or more overlay filters 68 are configured to establish one or more overlay fields 67 to overlay one or more zones of an intersection. The filter field 65 may be configured to adapt a field shape to include the one or more overlay filters based on a determination that the materials handling vehicle 10 is approaching the intersection.

In FIG. 11, the intersection rules may only dictate to identify any obstacles or approaching obstacles along the first aisle path 82 from the right of the figure. As such, it is contemplated that only one overlay filter 68 is used on the appropriate side (e.g., right in the figure) of the scan data. It should be understood, as shown in FIG. 11, that the overlay filter 68 may be of any shape or size. Therefore, if an obstacle is detected and present in the scan data along the left side of the scan field 55 but outside of the filter field 65, the obstacle scanning tool T will not process the associated scan data and will not identify that obstacle. It should also be understood that the filter field 65 may be changed to collectively encompass the filter field 65 and the overlay field 67. In other words, this disclosure is not limited to the use of overlay filters 68 and the same goal may be accomplished by changing the configuration of the path filter 64.

Referring generally to FIGS. 4-11, the obstacle scanning tool T implements two categories of rules; namely, field shape rules and behavioral rules. These two categories of rules are associated by conditions (e.g., obstacles, etc.) within an industrial environment at which they occur, such that for the various field shapes disclosed herein, there will be a set of behavioral rules applied. Field shape rules dictate the shape of the filter field 65 and the performance fields 70 and 70'. Non-limiting example factors that are implemented by the field shape rules include path intent, vehicle velocity, position within the industrial environment, etc. For example, a particular filter field shape will be selected if the materials handling vehicle 10 is anticipating turning (i.e., intent), if the vehicle velocity is within a high-performance level (e.g., performance level 3—arbitrary level not associated with actual truck performance) then the obstacle scanning tool T applied to the scan data will expand the filter field 65 to cover more area than a filter field 65 of a lower vehicle velocity within a mid-performance level (e.g., performance level 2) or a low-performance level (e.g., performance level 1). Alternatively, the filter field 65 will take on a different field shape if the materials handling vehicle 10 was approaching an intersection or one or more overlay filters 68 (FIGS. 10 and 11) may be added to the path filter 64. For example, the filter field 65 may be configured to adapt a field shape based on a determination that the materials handling vehicle 10 is approaching an intersection and a current speed Sc of the materials handling vehicle. These two alternate examples provide for different field shapes depending on vehicle speed or environmental conditions. It should be understood that the actual scan field shape of the laser scanner 50 is the scan field 55, and the "field shape" of the obstacle scanning tool T is the filter field 65 as applied by the obstacle scanning tool T to scan data from the scan field 55.

Behavioral rules describe how the vehicle should behave if obstacles are detected or not detected under current operating conditions. Depending on the result of obstacle detection, driving restrictions will be updated depending on the predefined behavioral rules. Driving restrictions are imposed when there are obstacles identified and lifted when obstacles are not identified. For example, and not by way of limitation, if the vehicle velocity is within a high-performance level (e.g., performance level 3), then the performance field $P_i$, 70, 70' is implemented on the scan data by the obstacle scanning tool T to provide additional area within the scan field 55 for obstacle detection. If obstacles were detected under these conditions, the behavioral rule reduces the performance level of the vehicle velocity in the form of an imposed speed limit by the obstacle scanning tool T. Alternatively, if the materials handling vehicle 10 is waiting to cross an intersection 80 and obstacles are detected (e.g., pedestrians or pallet along the path 60), the materials handling vehicle 10 will remain stationary until the obstacle is removed. It should be understood that the performance levels define a range of vehicle operation that the obstacle scanning tool T and/or operator can operate the materials handling vehicle within. If, for instance and not by way of limitation, a user is operating the materials handling vehicle at 0.5 meters/second in a performance level 3 and an obstacle is detected in the performance field 70, the obstacle scanning tool T may reduce to performance level 2 which has, for example, a vehicle velocity range of 0.5 meters/second to 0.25 meters/second. In this instance, the user would not be either warned to reduce velocity or have the obstacle scanning tool T force a change in velocity since the user was operating the materials handling vehicle 10 at a velocity that met two performance levels and thus, would not notice a change in velocity. The opposite is also true if the performance field 70 is clear of obstacles and the performance level was raised.

Figure 12:
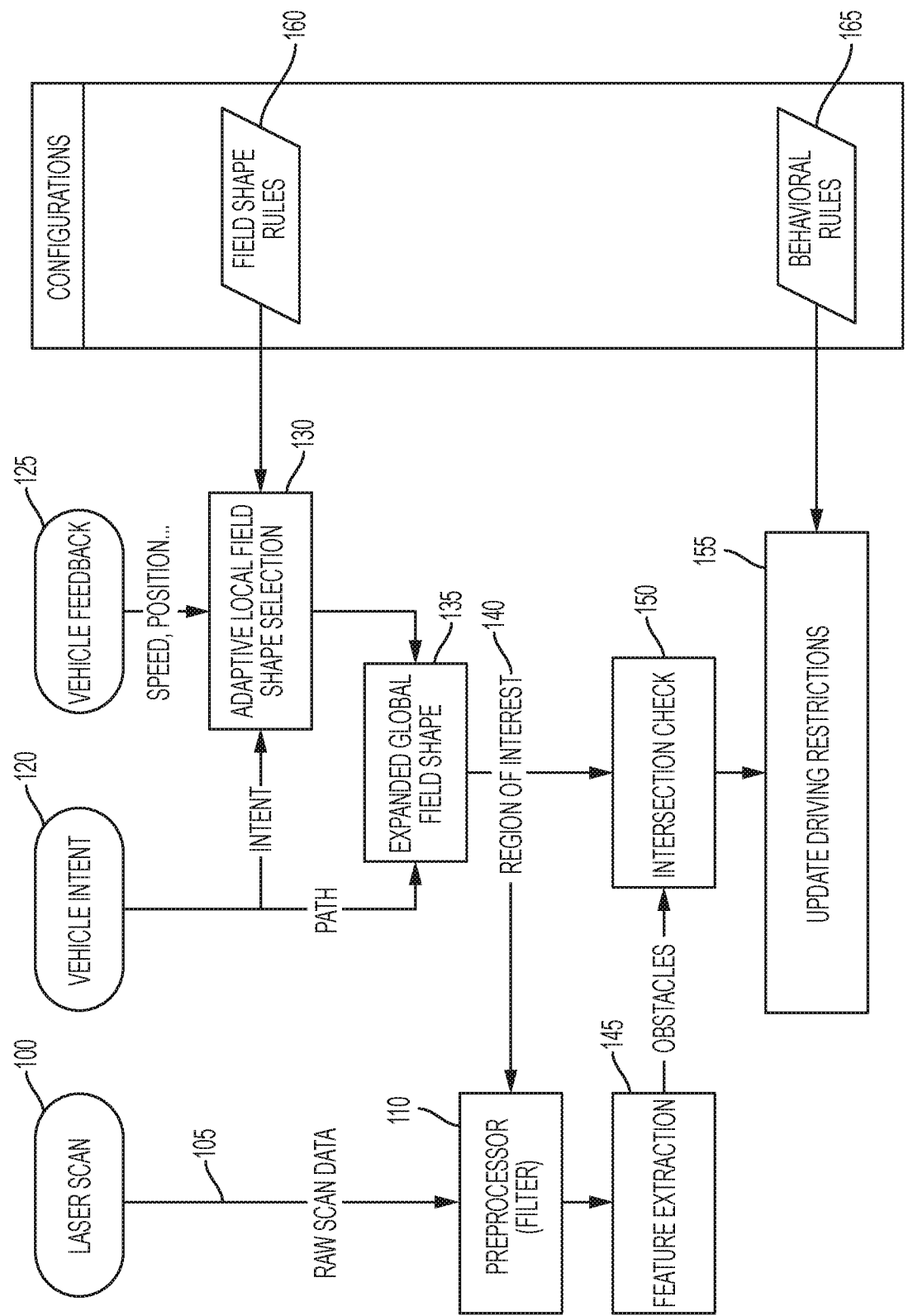
FIG. 12 is a flowchart illustrating a process used by the obstacle scanning tool to identify obstacles according to one or more embodiments shown and described herein.

Referring to FIG. 12, a flowchart is shown of the process used by the obstacle scanning tool T to identify obstacles. The laser scanner 50 (FIG. 4) scans 100 the industrial environment and records scan data (e.g., recorded in environmental data 255 (FIG. 3)). The scan data may be an array of measured distances for each angular step on a two-dimensional plane of the laser scanner 50. The scan data is transmitted 105 to obstacle scanning tool T (FIG. 1) where a total filter is applied 110 by the obstacle scanning tool T to the scan data to pare down the scan data to that scan data which is most likely to reside within the total filter. In other words, scan data which lies outside of the area defined by the total filter is removed from the scan data that is used for further processing to identify obstacles. The total filter is derived from vehicle intent 120 (e.g., anticipated operation of the materials handling vehicle 10) and vehicle feedback 125 (e.g., what is the materials handling vehicle's current velocity, steer angle, weight, etc.). Vehicle intent 120 refers to the anticipated task and motion of the materials handling vehicle before they are executed. This may be as general as following a pre-defined path with a set of predefined waypoints or as specific such as entering narrow aisles, and/or crossing intersections. Vehicle feedback 125 is vehicle data 260 (FIG. 3) regarding the materials handling vehicle's 10 current state which includes, but is not limited to, global position in the industrial environment, orientation or pose, velocity, and steer angle. Specifically, the adaptive local field selection 130 may be derived from the vehicle intent 120 and the vehicle feedback 125. The expanded global field shape 135 may be derived from the vehicle intent 120, the anticipated path of the materials handling vehicle at a destination D, and the adaptive local field selection 130. The expanded global field shape 135 defines a region of interest 140 (i.e., total filter) within the scan field 55.

The obstacle scanning tool T performs feature extraction 145 of obstacle features from the scan data by clustering similar scan data into obstacle features. An intersection check 150 is performed to identify if any of the obstacle features intersect within the area defined by the total filter (i.e., region of interest 140). If required, driving restrictions 155 are imposed on the materials handling vehicle 10.

Configuration data 250 (FIG. 3) comprises field shape rules 160 and behavioral rules 165. Field shape rules 160 are a set of filter field shapes which are chosen (adaptive local field selection 130) depending on the performance level of the materials handling vehicle 10. For example, and not by way of limitation, using vehicle velocity as the metric, if the velocity of the materials handling vehicle 10 is between 0 m/s and 0.1 m/s, the performance level is level 1 and the filter field 65 is 2.8 meters wide by 2 meters long. Continuing the example, if the velocity of the materials handling vehicle 10 is greater than 0.1 m/s and less than 0.5 m/s, the performance level is level 2 and the filter field 65 is 2.8 meters wide by 2.5 meters long and if the velocity of the materials handling vehicle 10 is between 0.5 m/s and 1.0 m/s, the performance level is level 3 and the filter field 65 is 3.0 meters wide by 5 meters long. It should be understood that the dimensions given form a square however, that square shape may be clipped once overlayed with the scan field 55 (i.e., the scan range 57 (FIG. 4) in conjunction with the scan arc 0 (FIG. 4)). It should also be understood that the dimensions given could form other shapes and the example is not limited to a square shape.

Behavioral rules 165 define how the materials handling vehicle 10 should be operated if an obstacle is identified or not identified at certain geolocations within the industrial environment 81 (FIG. 10). The behavioral rules 165 include if there are obstacles identified in the filter field 65 for the currently selected performance level, reduce the performance level. If there are no obstacles identified in the filter field 65, implement the performance field $P_i$, 70, 70' and check for identified obstacles. Alternatively, the addition of the overlay filters 68 (FIGS. 10 and 11) may be used in conjunction with the path filter 64 before the performance field $P_i$, 70, 70' is checked. For example, and not by way of limitation, referring to FIGS. 10 and 11, when arriving at an intersection 80 (given by vehicle position and orientation) and with the intention to cross the intersection, a filter field 65 may be formed (based on field shape rules 160) in different ways according to the desired behavior. In FIG. 10, the obstacle scanning tool T will give the right of way to all obstacles identified in the scan field 55 while in FIG. 11, the obstacle scanning tool T will give the right of way to only those obstacles identified in front and to the right of the materials handling vehicle 10.

Referring to FIG. 8, an optional step may be included between blocks 818 and 822 to increase the performance level $L_i$ associated with a performance field $P_i$ (or a filter field $F_i$ in FIG. 9 and between blocks 918 and 932) if the obstacle scanning tool T does not detect any obstacles in the scanned field. For example, with respect to the example of FIG. 8, it is contemplated that the performance field $P_i$ associated with a current performance level $L_i$ may be increased to a next performance level $L_{(i+1)}$ greater than the current performance level $L_i$ such that, if the obstacle scanning tool T does not identify any obstacles in the performance field $P_i$, at the current performance level $L_i$, the behavioral rules 165 allow for the driving restrictions to be decreased (i.e., increase speed, etc.) to match the next performance level $L_{(i+1)}$. Additionally, the field may be enlarged to a next performance field $P_{(i+1)}$ associated with the next performance level $L_{(i+1)}$ if available. It is contemplated that a performance level $L_i$ is not the actual performance level settings on the materials handling vehicle 10 but rather, a metric for the obstacle scanning tool T to define a range for overall vehicle behavior. If there are obstacles detected in the filter field 65, the obstacle scanning tool T will reduce the vehicle's performance level $L_i$ to one that is lower (i.e., $L_{(i-1)}$), until the velocity of the materials handling vehicle is zero where the materials handling vehicle stops. If, however, the filter field 65 is clear of identified obstacles, and the performance level $L_i$ is not at a maximum performance level $L_{MAX}$, the obstacle scanning tool T will search for obstacles in the performance field $P_i$ at the performance level $L_i$. If the performance field $P_i$ is also clear and the maximum performance level $L_{MAX}$ has not been reached, the materials handling vehicle 10 will be granted with the ability to go into a next performance level $L_{(i+1)}$ (i.e., not required to go to that performance level). The performance field $P_i$ may correspondingly be increased to the performance field $P_{(i+1)}$. If the performance field $P_i$ is not clear, then the materials handling vehicle 10 will stay in the current performance level $L_i$ and may go into a reduced next performance level $L_{(i-1)}$ as set forth in blocks 824-830 of the process 800 of FIG. 8.

Similarly, between blocks 918 and 932 of FIG. 9, if the filter field $F_i$ is clear of identified obstacles, and the performance level $L_i$ is not at a maximum performance level $L_{MAX}$, the materials handling vehicle 10 will be granted with the ability to go into a next performance level $L_{(i+1)}$ (i.e., not required to go to that performance level). The filter field $F_i$ may correspondingly be increased to the filter field $F_{(i+1)}$. If the filter field $F_i$ is not clear, then the materials handling vehicle 10 will stay in the current performance level $L_i$ and may go into a reduced next performance level $L_{(i-1)}$ as set forth in blocks 924-930 of the process 900 of FIG. 9.

The obstacle scanning tool T takes advantage of the knowledge of vehicle intent to achieve adaptable detection field shapes while the vehicle is travelling/operating. This allows detection field shapes to be generated on a per situation basis that is more suitable than preconfigured, non-adaptable fields. In addition to obstacle detection in the direction of travel, higher level situational fields (i.e., performance fields) can be defined to enforce operational rules. For example, knowing the vehicle's intention is to cross an intersection, the system can adjust the detection fields to search for oncoming traffic and apply right-of-way rules.

It is noted that the terms "sensor" or "scanner" as used herein, denote a device that measures a physical quantity and converts it into a signal which is correlated to the measured value of the physical quantity. Furthermore, the term "signal" means an electrical, magnetic or optical waveform, such as current, voltage, flux, DC, AC, sinusoidal-wave, triangular-wave, square-wave, and the like, capable of being transmitted from one location to another.

It is also noted that recitations herein of "at least one" component, element, etc., should not be used to create an inference that the alternative use of the articles "a" or "an" should be limited to a single component, element, etc.

Certain terminology is used in the disclosure for convenience only and is not limiting. Words like "left," "right," "front," "back," "upper," "lower," etc., designate directions in the drawings to which reference is made. The terminology includes the words noted above as well as derivatives thereof and words of similar import.

It is noted that, while aspects of the present disclosure may be presented as being performed in a particular sequence in the depicted embodiments, the functions can be performed in an alternative order without departing from the scope of the present disclosure. It is furthermore noted that one or more of these aspects can be omitted without departing from the scope of the embodiments described herein.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A materials handling vehicle comprising
a laser scanner;
a vehicle drive mechanism, and
an obstacle scanning tool, wherein:
the vehicle drive mechanism facilitates movement of the materials handling vehicle and materials handled by the materials handling vehicle along a travel path of an environment at a vehicle speed $S_c$ towards a destination;
the obstacle scanning tool comprises obstacle scanning hardware establishing a scan field, and a total filter configured to filter scan data from the scan field in a region of interest defined by the total filter based on vehicle intent and vehicle feedback, and is configured to indicate a presence of obstacles in the region of interest;
the laser scanner executes logic to
scan the environment in the scan field to generate the scan data, and
transmit the scan data to the obstacle scanning tool; and
the obstacle scanning tool executes obstacle scanning logic to
apply the total filter to the scan data to pare down the scan data to filter scan data comprising the scan data residing within the region of interest,
perform feature extraction of obstacle features indicative of the presence of obstacles from the filter scan data,
identify whether any of the obstacle features intersect within the region of interest, and
update one or more driving restrictions on the materials handling vehicle when the one or more obstacle features intersect within the region of interest.

2. The materials handling vehicle of claim 1, wherein:
the scan data is configured as an array of measured distances for each angular step on a two-dimensional plane of the laser scanner.

3. The materials handling vehicle of claim 1, wherein:
the vehicle intent is indicative of an anticipated operation of the materials handling vehicle.

4. The materials handling vehicle of claim 1, wherein:
the vehicle intent is indicative of an anticipated task and motion of the materials handling vehicle before execution.

5. The materials handling vehicle of claim 4, wherein:
the anticipated task and motion comprises intent to follow a pre-defined path with a set of predefined waypoints.

6. The materials handling vehicle of claim 4, wherein:
the anticipated task and motion comprises intent to enter narrow aisles, cross intersections, or combinations thereof.

7. The materials handling vehicle of claim 1, wherein:
the vehicle feedback is indicative of a current velocity, steer angle, or weight of the materials handling vehicle.

8. The materials handling vehicle of claim 1, wherein:
the vehicle feedback is indicative of vehicle data regarding a current state of the materials handling vehicle comprising a global position, an orientation, a pose, a velocity, a steer angle, or combinations thereof.

9. The materials handling vehicle of claim 1, wherein:
an adaptive local field selection is derived from the vehicle intent and the vehicle feedback;
an expanded global field shape is derived from the vehicle intent, an anticipated path of the materials handling vehicle at the destination, and the adaptive local field selection; and
the region of interest within the scan field is defined by the expanded global field shape.

10. The materials handling vehicle of claim 1, wherein:
configuration data comprises field shape rules and behavioral rules is used to update the one or more driving restrictions;
the field shape rules comprise a set of filter field shapes of a filter field established by the total filter, the set of filter field shapes chosen by an adaptive local field selection based on a performance level of the materials handling vehicle; and
the behavioral rules define operation of the materials handling vehicle based on identification of the obstacles at a geolocation.

11. The materials handling vehicle of claim 10, wherein:
when one or more of the obstacles are identified in the filter field for a currently selected performance level, the behavioral rules are configured to reduce the performance level; and
when none of the obstacles are identified in the filter field, a performance field broader than the filter field is implemented to check for the obstacles.

12. The materials handling vehicle of claim 11, wherein:
an overlay filter is used together with the total filter before the performance field is checked for the obstacles such that, when the materials handling vehicle arrives at an intersection with a vehicle intent to cross the intersection, the filter field is formed based on the configuration data.

13. The materials handling vehicle of claim 12, wherein:
the obstacle scanning tool is configured to give a right of way to the obstacles identified in the scan field when the overlay filter encompasses an area to the left, front, and right of the materials handling vehicle at the intersection.

14. The materials handling vehicle of claim 12, wherein:
the obstacle scanning tool is configured to give a right of way to the obstacles identified in the scan field only in front of and to the right of the materials handling vehicle when the overlay filter encompasses an area to the front and the right of the materials handling vehicle at the intersection.

15. The materials handling vehicle of claim 10, wherein:
the set of filter field shapes are chosen by the adaptive local field selection based on a performance level and velocity metric of the materials handling vehicle to establish the filter field with dimensions that form a square shape.

16. The materials handling vehicle of claim 15, wherein:
a scan arc and a scan range define the scan field; and
the square shape is configured to be clipped when overlaid with the scan field together with the scan arc.

17. A method of operating a materials handling vehicle, the method comprising:
moving via a vehicle drive mechanism the materials handling vehicle and materials handled by the materials handling vehicle along a travel path of an environment at a vehicle speed $S_c$ towards a destination, wherein
the materials handling vehicle further comprises a laser scanner and an obstacle scanning tool,
the obstacle scanning tool comprises obstacle scanning hardware establishing a scan field, and a total filter configured to filter scan data from the scan field in a region of interest defined by the total filter based on vehicle intent and vehicle feedback, and is configured to indicate a presence of obstacles in the region of interest;
executing logic by the laser scanner to
scan the environment in the scan field to generate the scan data, and
transmit the scan data to the obstacle scanning tool; and
executing obstacle scanning logic by the obstacle scanning tool to
apply the total filter to the scan data to pare down the scan data to filter scan data comprising the scan data residing within the region of interest,
perform feature extraction of obstacle features indicative of the presence of obstacles from the filter scan data,
identify whether any of the obstacle features intersect within the region of interest, and
update one or more driving restrictions on the materials handling vehicle when the one or more obstacle features intersect within the region of interest.

18. The method of claim 17, wherein:
the vehicle intent is indicative of an anticipated operation of the materials handling vehicle; and
the vehicle feedback is indicative of a current velocity, steer angle, or weight of the materials handling vehicle.

19. The method of claim 17, wherein:
deriving an adaptive local field selection from the vehicle intent and the vehicle feedback;
deriving an expanded global field shape from the vehicle intent, an anticipated path of the materials handling vehicle at the destination, and the adaptive local field selection; and
defining the region of interest within the scan field by the expanded global field shape.

20. The method of claim 17, wherein:
updating the one or more driving restrictions based on configuration data that comprises field shape rules and behavioral rules;
choosing by an adaptive local field selection a set of filter field shapes based on a performance level of the materials handling vehicle, the field shape rules comprising the set of filter field shapes of a filter field established by the total filter; and
operating the materials handling vehicle based on the behavioral rules and identification of the obstacles at a geolocation.

21. A materials handling vehicle comprising
a vehicle drive mechanism, and
an obstacle scanning tool, wherein:
the vehicle drive mechanism facilitates movement of the materials handling vehicle and materials handled by the materials handling vehicle along a travel path of an environment at a vehicle speed $S_c$ towards a destination;

the obstacle scanning tool comprises obstacle scanning hardware establishing a scan field, and a path filter establishing a filter field, and an overlay filter establishing one or more overlay fields;

the obstacle scanning tool executes obstacle scanning logic to establish the filter field using the path filter, establish the one or more overlay fields associated with one or more zones of an intersection using the overlay filter, scan for obstacles in the filter field and the one or more overlay fields at the intersection, and operate the materials handling vehicle based on intersection rules for the intersection and in response to the scan for obstacles.

22. The materials handling vehicle of claim 21, wherein the path filter is configured to adapt a field shape of the filter field to include the overlay field based on a determination that the materials handling vehicle is approaching the intersection.

23. The materials handling vehicle of claim 21, wherein:

configuration data comprising field shape rules and behavioral rules is used to operate the materials handling vehicle;

the field shape rules dictate a field shape of the filter field established by the path filter based on path intent for vehicle operation, vehicle velocity based on the vehicle speed $S_c$, vehicle position in the environment, or combinations thereof; and the behavioral rules define operation of the materials handling vehicle using driving restrictions based on identification of the obstacles under current operating conditions.

24. The materials handling vehicle of claim 21, wherein the filter field is associated with the travel path comprising a forward aisle path of the intersection, and the one or more zones of the intersection associated with the one or more overlay fields comprise a left aisle path of the intersection, a right aisle path of the intersection, or both.

* * * * *

UNITED STATES PATENT AND TRADEMARK OFFICE
CERTIFICATE OF CORRECTION

PATENT NO. : 11,110,957 B2  
APPLICATION NO. : 16/791692  
DATED : September 7, 2021  
INVENTOR(S) : Alan Stewart and Yuan Mai Page 1 of 1

It is certified that error appears in the above-identified patent and that said Letters Patent is hereby corrected as shown below:

In the Specification

In Column 6, Line(s) 26, delete "Pat. No." and insert --Pat. Nos.--, therefor.

In Column 17, Line(s) 61, after "arc", delete "0" and insert --Ø--, therefor.

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*